ELECTRONIC PREVIEWER FOR COLOR REPRODUCTION PROCESSES

Filed Nov. 23, 1959 10 Sheets-Sheet 1

March 3, 1964 W. F. BAILEY 3,123,666

ELECTRONIC PREVIEWER FOR COLOR REPRODUCTION PROCESSES

Filed Nov. 23, 1959 10 Sheets-Sheet 6

March 3, 1964 W. F. BAILEY 3,123,666

ELECTRONIC PREVIEWER FOR COLOR REPRODUCTION PROCESSES

Filed Nov. 23, 1959 10 Sheets-Sheet 7

3,123,666
Patented Mar. 3, 1964

3,123,666
ELECTRONIC PREVIEWER FOR COLOR REPRODUCTION PROCESSES

William F. Bailey, Valley Stream, N.Y., assignor to Hazeltine Research, Inc., a corporation of Illinois Filed Nov. 23, 1959, Ser. No. 854,742
11 Claims. (Cl. 178—5.2)

This invention relates to electronic simulation of color reproduction processes, and particularly to an electronic previewer for substantially instantaneously producing from an original color picture an electronic color image of the color reproduction which will be obtained from the original by means of such a process. The invention further relates to an electronic previewer for determining in advance the proper adjustments of the various individual operations involved in a complete color printing process in order that the color reproduction shall have an optimum appearance.

Color reproduction processes for the mass publishing industries, i.e., newspapers, magazines, books, etc., are usually of the color printing variety. These involve production of at least three printing plates of metal or other durable material respectively carrying photo-engraved half-tone images of individual primary color components of the original picture to be printed. These are typically cyan, magenta, and yellow, and correspond to the colors of the inks, dyes or other pigments which are printed to form the reproduction. Very often a fourth plate is also prepared carrying an image of the amount of black in each incremental region of the original picture, thus reproducing the brightness or "tone" variations from region to region. Each printing plate is then coated with the pigment of corresponding color, and the coated plates are successively impressed in register on a sheet of substantially white paper. The resultant overlaid colored images together form the composite printed color reproduction.

The manner in which the color-separation images are defined on the printing plates distinguishes the different types of color printing processes. For example, in relief or "letterpress" printing the image on each plate is elevated relative to the remaining surface, the non-image regions being etched away to a uniform depth. In intaglio or "gravure" printing the image is depressed relative to the remaining surface, thus forming hollows in which the ink is retained. In "planographic" printing, which is widely used where a relatively limited number of reproductions is required, all areas of the printing plate remain coplanar, the image being distinguished by the presence of an ink-repellent grease in the non-image areas. This technique characterizes lithography and photolithography.

The resultant color obtained in a given incremental region of the printed reproduction depends on the relative amounts of the various colored inks or other pigments laid down therein by the printing plates, and is controlled by "half-toning" the printing plate images. That is, each photo-engraved image comprises a large number of minute individual dots which print discrete colored dots when the plate is impressed on the printing paper. The half-toning process causes the dots on each plate to be of predetermined maximum area in regions where color corresponding to the separation image thereon is most dense, and to be of minimum area in regions where that color is of least density. Dots of intermediate area are formed in regions of density. Since the eye cannot resolve the individual ink dots in any elemental region containing one dot of each color when the printed reproduction is viewed from a normal distance, the resultant color of each such region will be determined by the relative proportions of the areas of the cyan, magenta, and yellow dots therein. In addition, the tonal value or brightness of such a region will be reproduced by virtue of the presence of large black ink dots in shadows, smaller black dots in middle-tones, and minimum area black dots in highlights.

In view of the many operations involved in a complete color printing process, and because it has not heretofore been possible to accurately predict the ultimate effect on the final color reproduction of a given adjustment of any of such operations, achievement of good color and tone rendition has necessitated subjecting each printing plate to a lengthy cut-and-try hand retouching operation known as "proofing." The usual procedure is to first produce a set of "proofs," or individual inked impressions of the images on the respective plates. A composite proof may also be produced. A skilled artisan then makes a subjective estimate of what corrections are needed, and proceeds to use acid etching or equivalent techniques in an attempt to alter the relative sizes of the dots in different areas of each plate to the proper degree to effect such corrections. Another series of proofs is then produced, and the entire procedure is repeated as many times as necessary to obtain a set of proofs which the artisan judges to be satisfactory. The entire retouching operation is thus very time-consuming and expensive, and, in addition, provides results which vary in quality with the experience and skill of the individual artisan. When the reproductions must be printed in time to meet a definite publishing deadline, as in a daily or weekly publication, the foregoing factors may actually prevent the inclusion of a desired picture in the appropriate edition.

Accordingly, a principal object of the invention is to provide electronic previewing means capable of substantially instantaneously displaying from an original color picture an electronic image of the color reproduction which will be obtained therefrom by means of a color reproduction process.

A further object is to provide such electronic previewing means which is adjustable in correspondence with the various operations of a color printing process so as to determine in advance the proper adjustments thereof to obtain an optimum appearance of the color reproduction.

A further object is to provide electronic previewing means which includes electronic color-image-reproducing means and which is adapted to simulate the relationship between respective color-separation printing plate impressions and the appearance of the printed color reproduction which will be obtained therefrom, an electronic color image having substantially the same appearance as such reproduction being displayed by the image-reproducing means.

Pursuant to the foregoing objects, the invention provides an electronic previewer including electronic color image-reproducing means for producing an electronic image of the color reproduction which will be obtained from an original color picture by a color reproduction process. The latter process may be one wherein the reproduction is formed by overlaying impressions of respective primary color-separation images of the original picture in pigments of the corresponding colors. Such a previewer comprises electro-optical input means including an electronic scanner for deriving from the original picture electrical signals respectively representative of the reflection densities of the foregoing pigmented color-separation impressions. The previewer further comprises matrixing circuit means connected to the foregoing input means for translating the reflection density-representative signals to the image-reproducing means and modifying them in accordance with the relative spectral absorptions of the pigments employed as well as the relative spectral taking responses of the image-reproducing means in each of a plurality of spectral regions. The modified signals thus applied thereto cause the image-reproducing means to display the desired electronic color image of the color reproduction.

For a more complete description of the invention, together with further objects and features thereof, reference may be had to the following detailed specification and accompanying drawings, noting, however, that the actual scope of the invention is pointed out in the appended claims.

Referring to the drawings.

Figure 4:
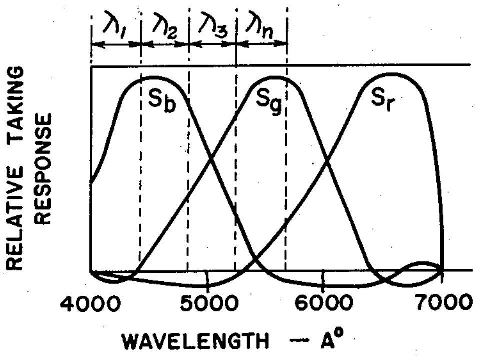
Figure 10:
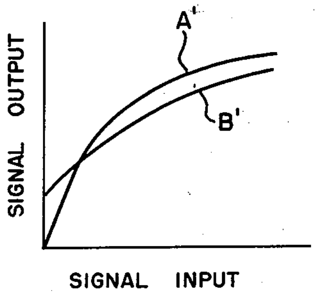
Figure 9:
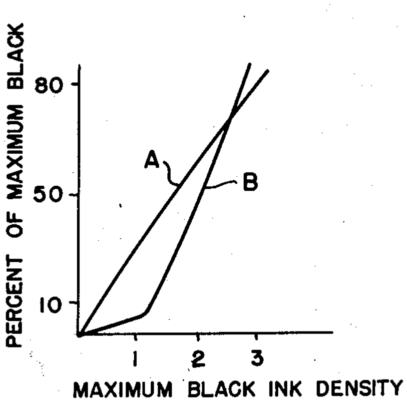
Figure 3A:
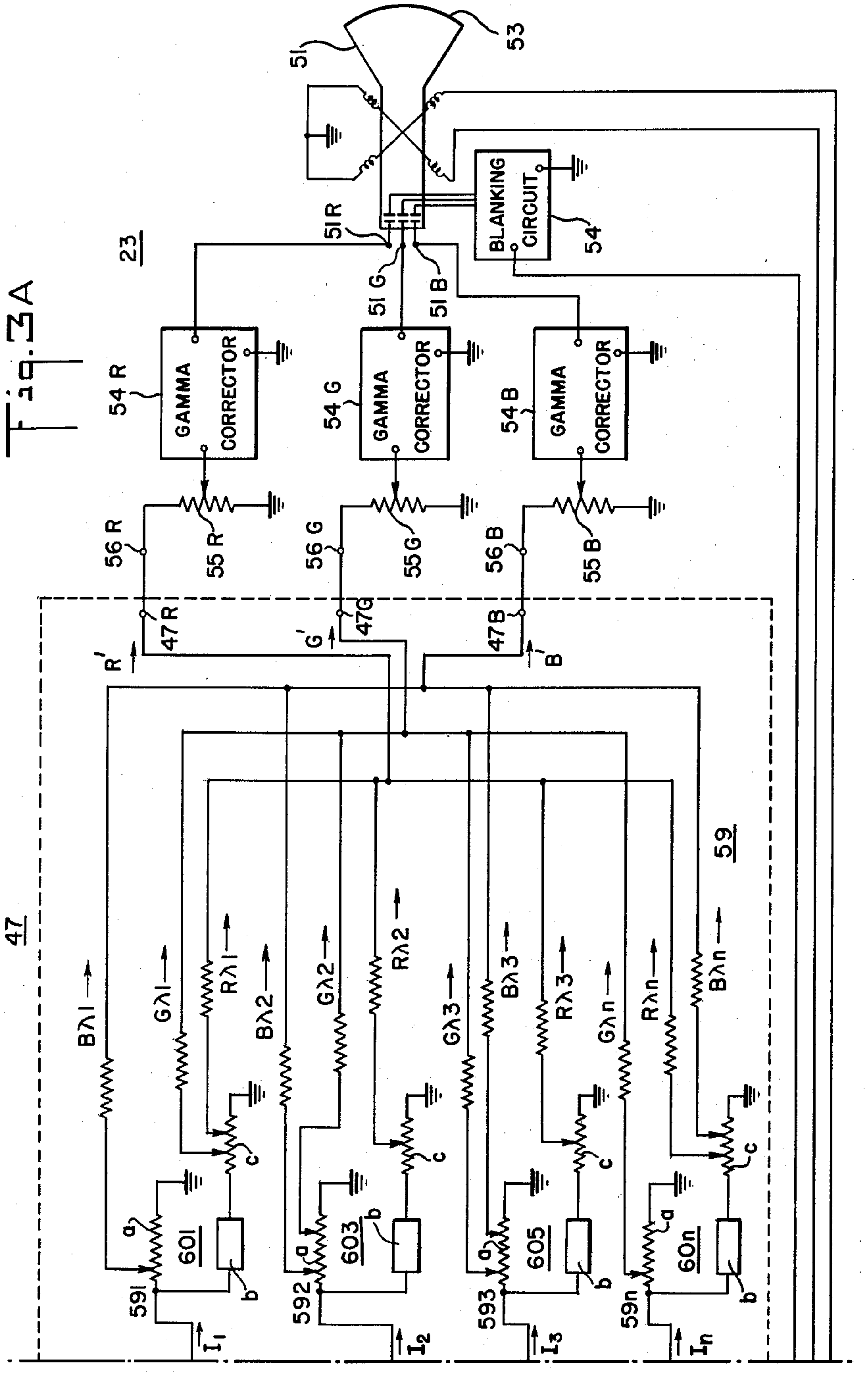
Figure 3:
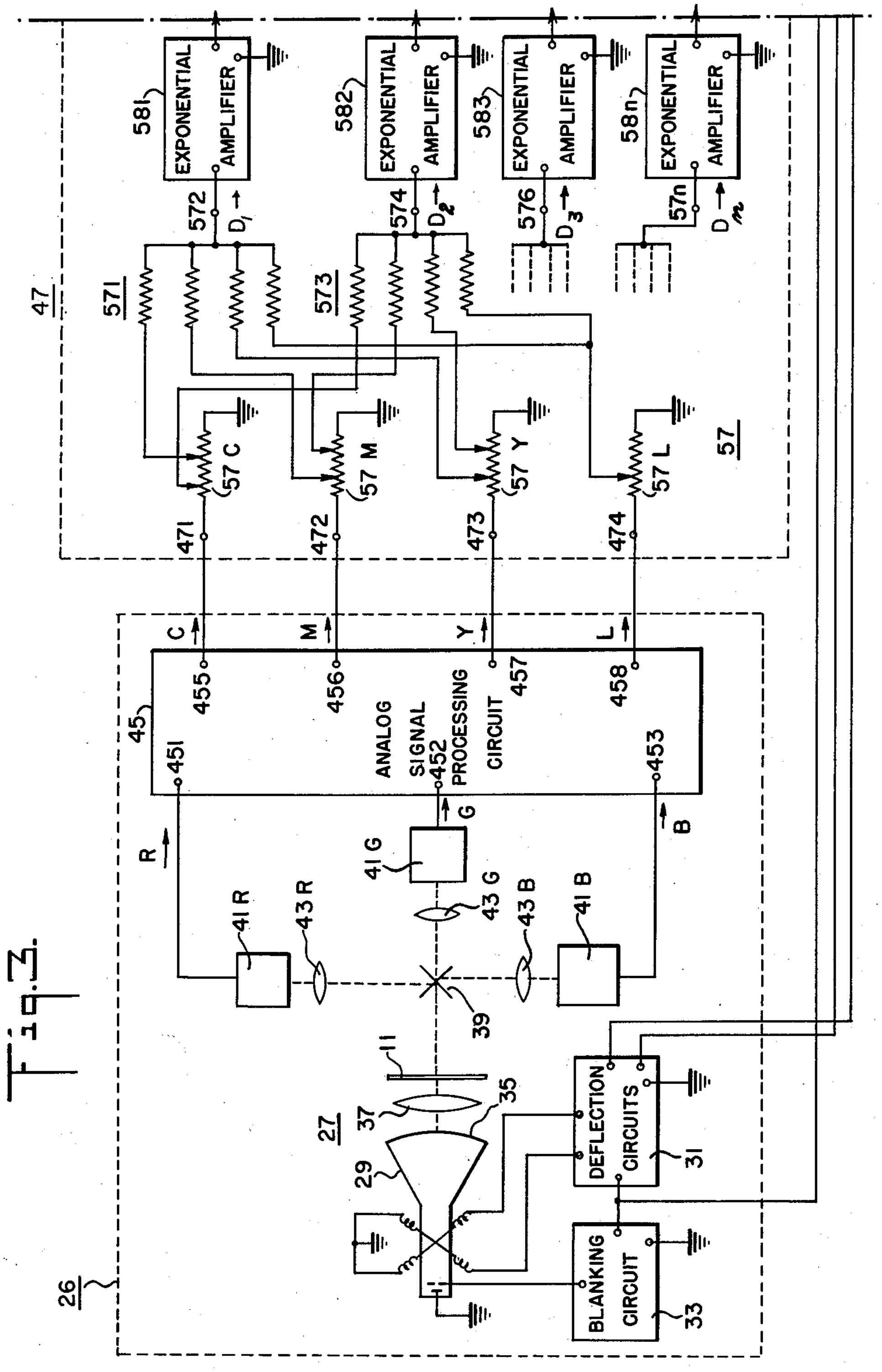
Figure 5:
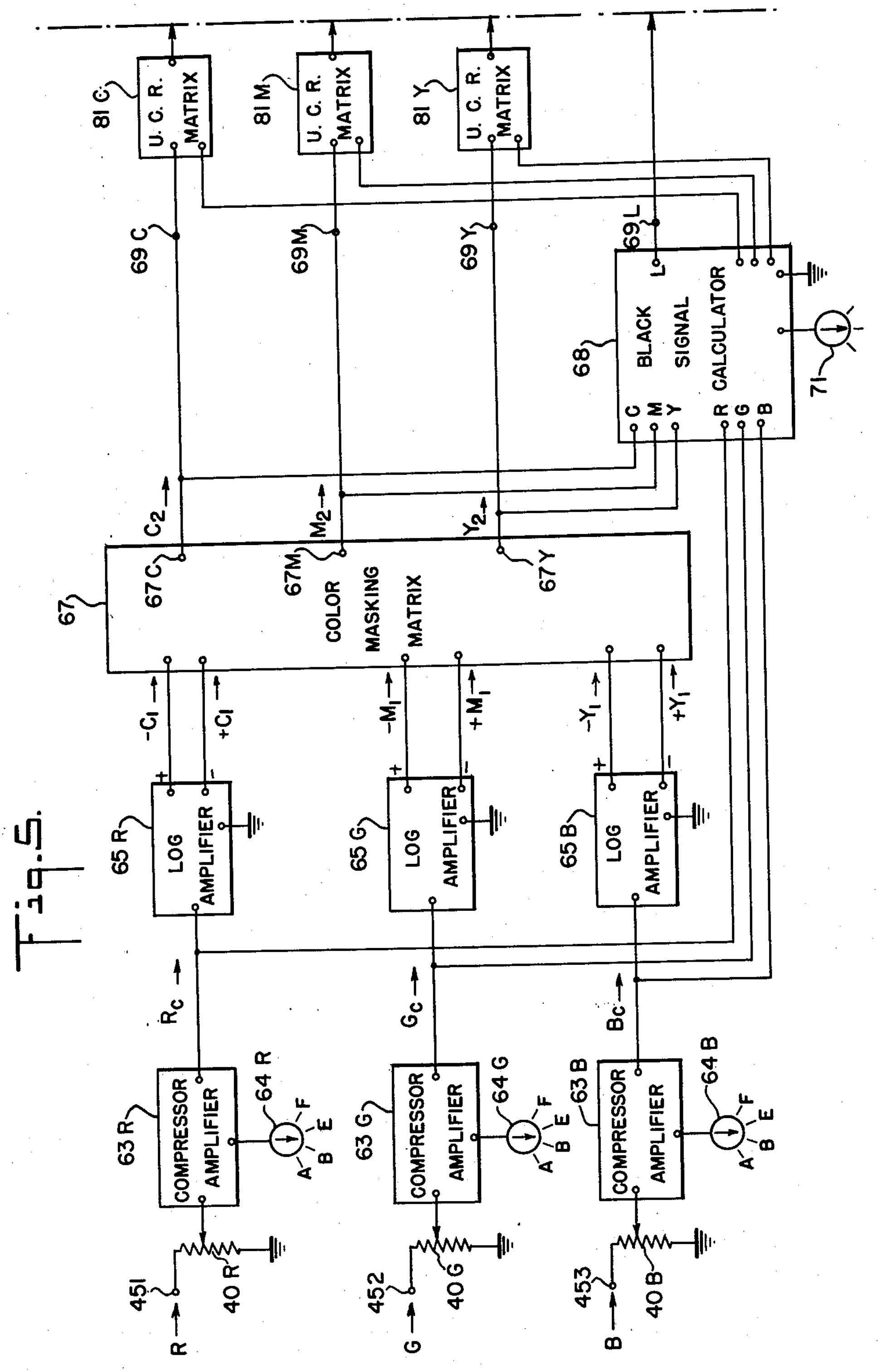
Figure 5A:
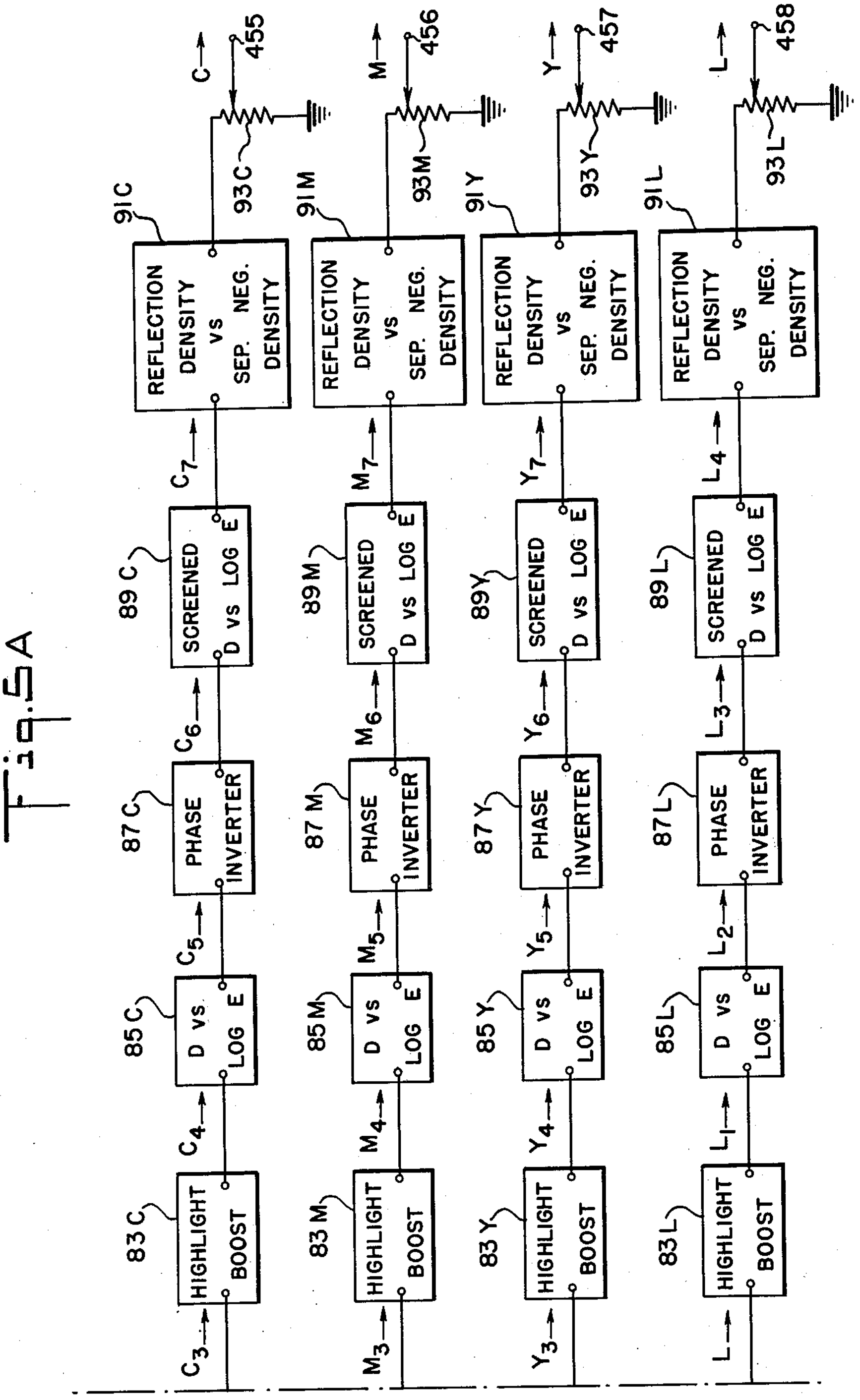
Figure 6:
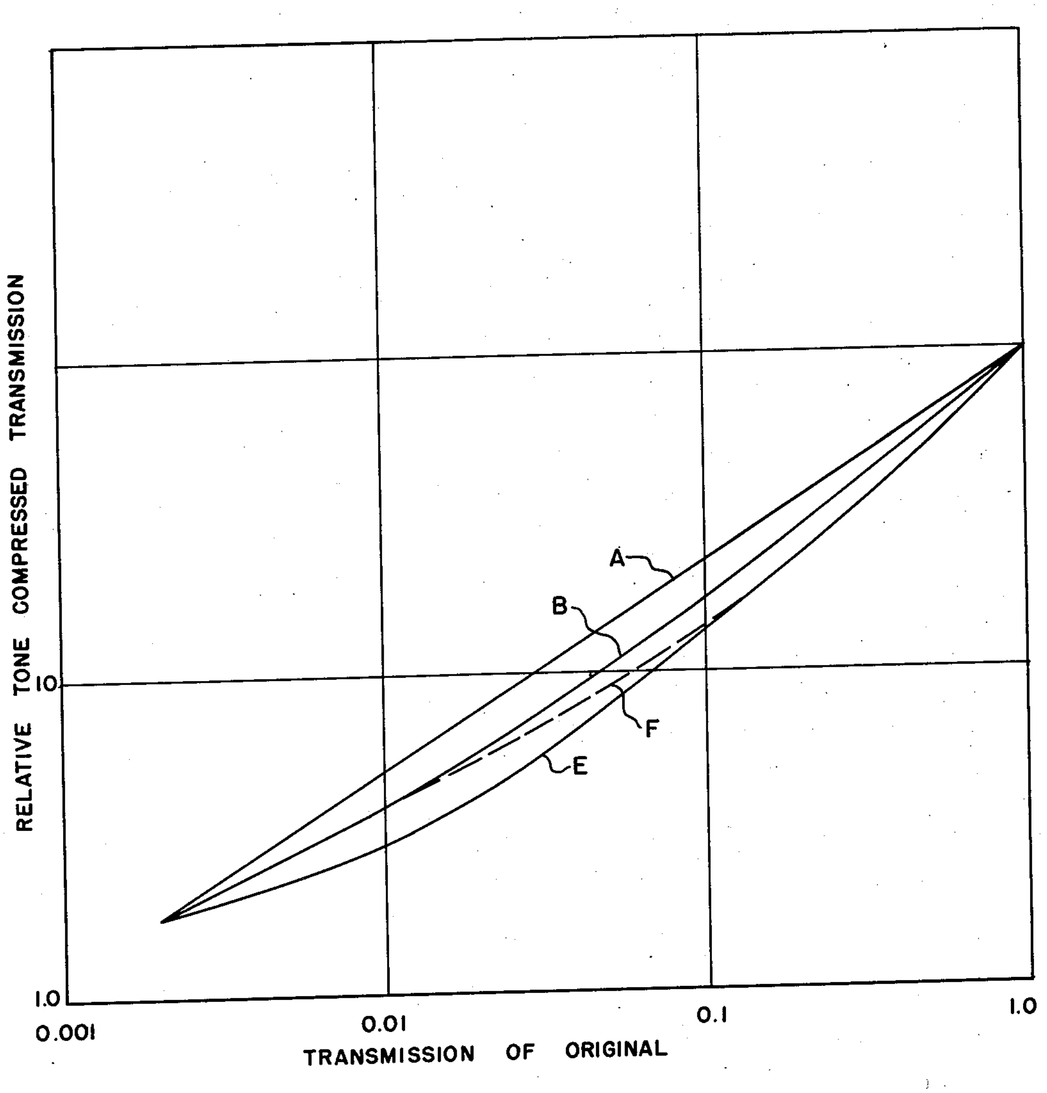
Figure 5A:
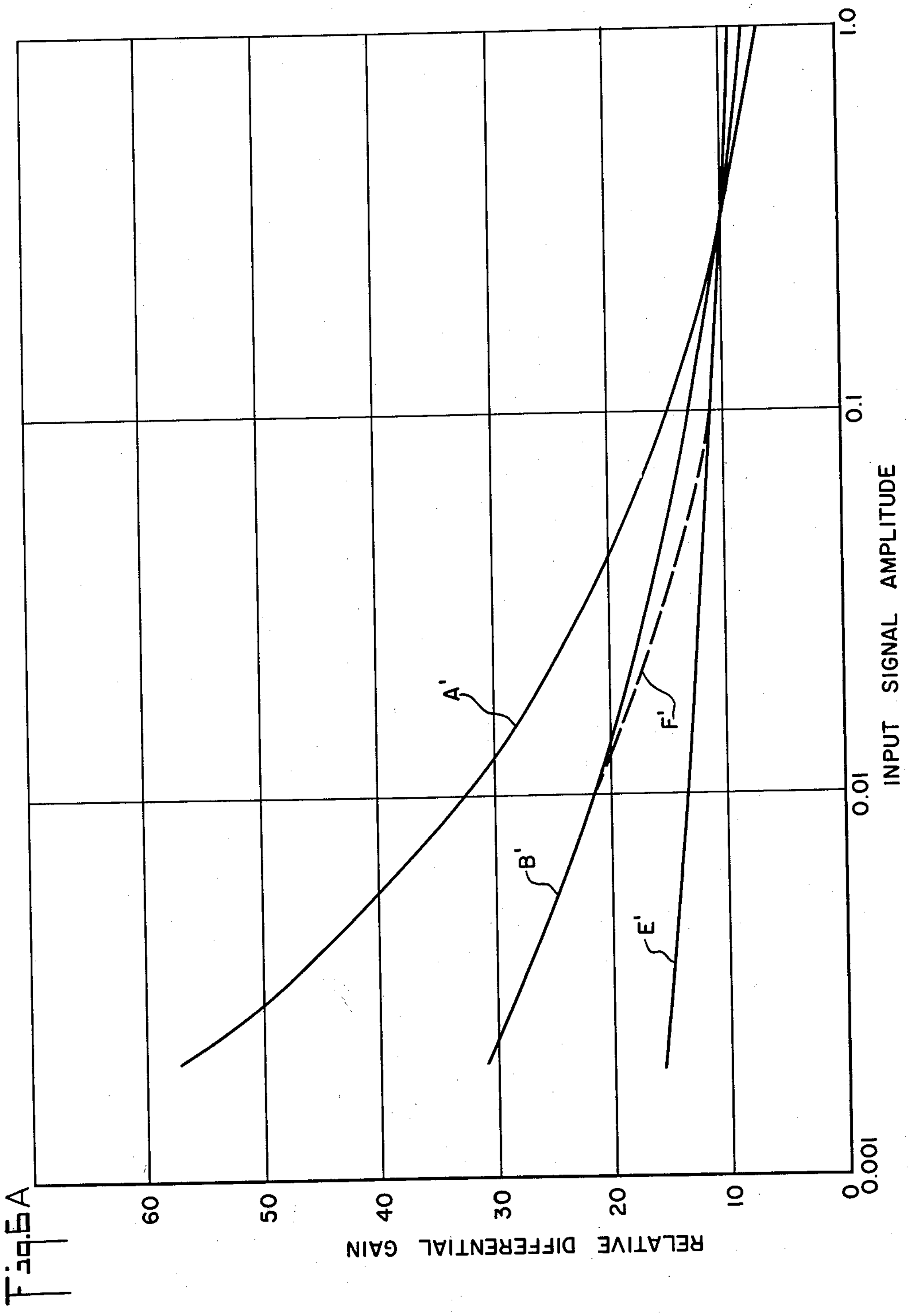
Figure 7:
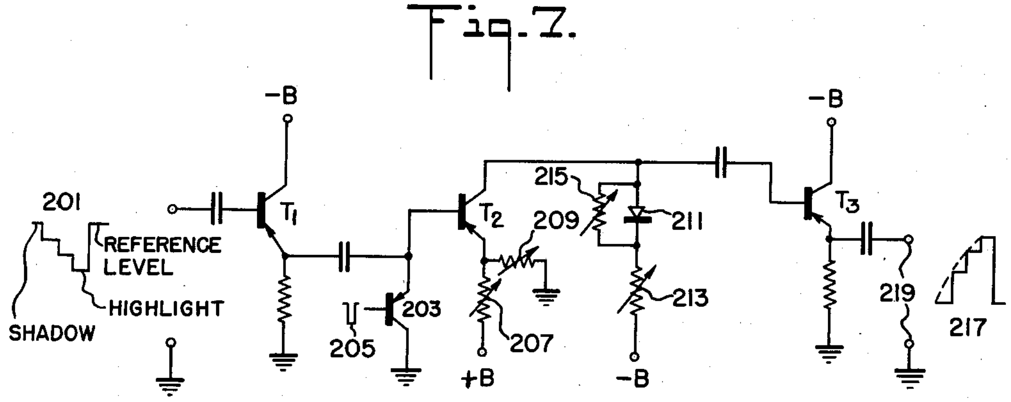
Figure 8:
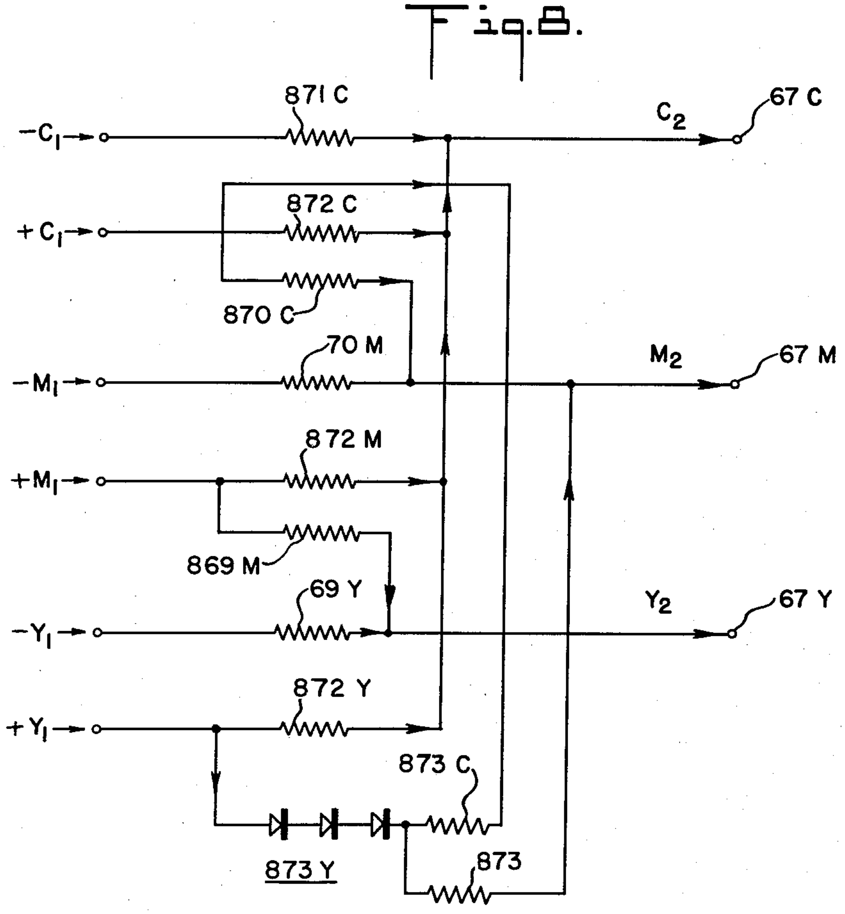
Figure 11:
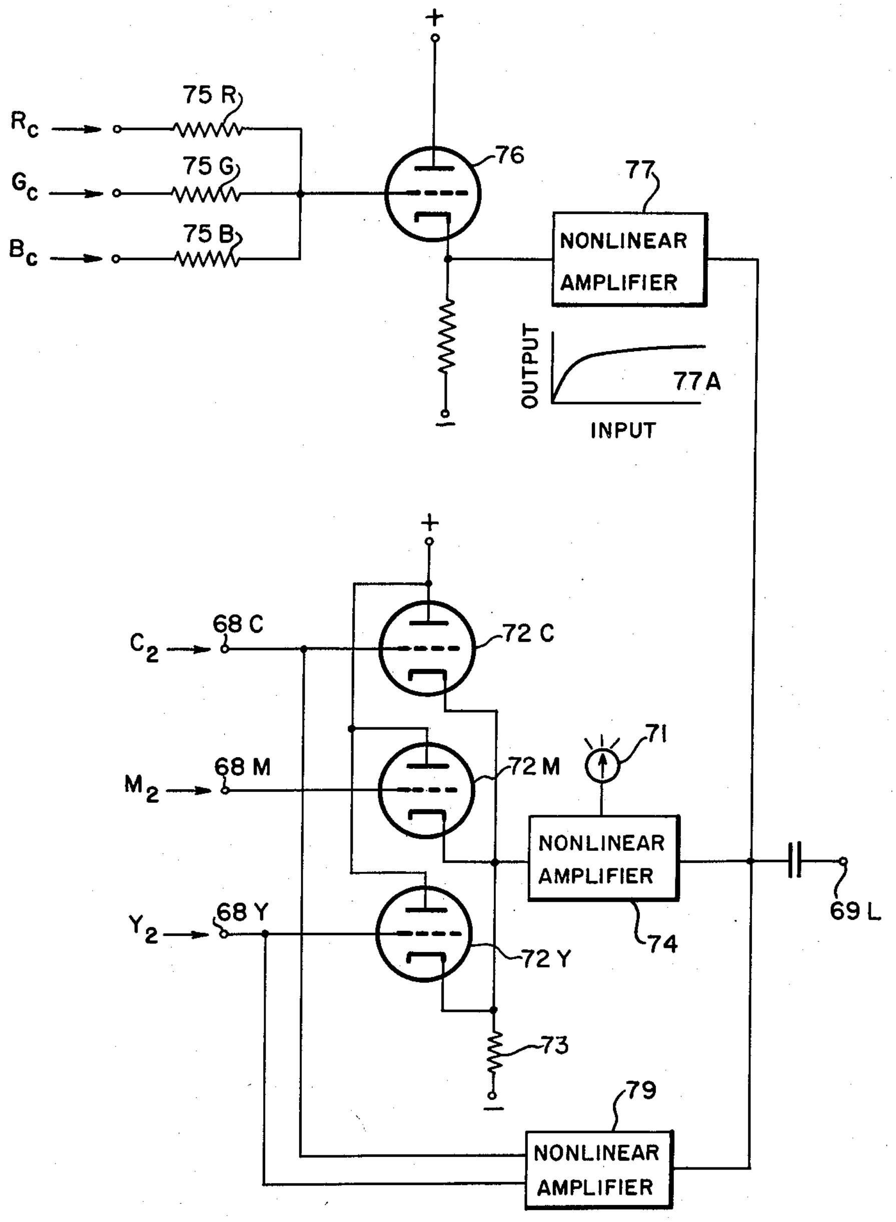

FIG. 3, with its continuation on sheet 4 as FIG. 3A, is a circuit diagram of an embodiment of an electronic previewer constructed in accordance with the invention;

FIG. 4 is a graph of the spectral taking responses of a typical tricolor cathode-ray picture tube;

FIGS. 5 and 5A, when viewed as one, constitute a block diagram of a particular type of adjustable analog processing circuit which may be utilized in an electronic previewer constructed in accordance with the invention;

FIGS. 6 and 6A are graphs of various photographic tone-compression characteristics and of the analogous electrical signal gain characteristics involved in construction of a portion of the analog processing circuit of FIG. 3;

FIG. 7 is a circuit drawing of a nonlinear transistor amplifier capable of adjustment to provide a wide variety of types of nonlinear signal-translation characteristics;

FIG. 8 is a circuit drawing of a particular type of nonlinear color masking matrix which may be used in the analog processing circuit of FIG. 5;

FIGS. 9 and 10 are graphs illustrative of various characteristics involved in the production of a black color-separation negative density-representative signal by the analog processing circuit of FIG. 5, and FIG. 11 is a circuit diagram of a specific type of black signal calculator suitable for use in the analog processing circuit of FIG. 5.

*Description of Prior Color Printing Techniques*

In an attempt to reduce the time required to obtain reliable color reproductions, electromechanical and electronic equipment has previously been developed which is capable of actually performing one or more of the operations of a complete photomechanical printing process. A description of various types of such equipment may be found, for example, in the article "Electronic Color Scanning and Engraving," by S. W. Levine, appearing at pages 107–122 of Part A of the 9th Annual Meeting of the Technical Association of the Graphic Arts, Inc., May 13–15, 1957. A particularly successful type of electromechanical printer, identified therein as the "Time Inc. Color Scanner," employs a rotating glass cylinder which also moves very slowly in an axial direction past a bank of three photocells. The picture to be reproduced, described as a photographic color transparency, is wrapped on the cylinder and a spot of light is focused thereon from within. The resulting emergent light beam is split into its red, green, and blue color components, these beams being respectively directed to the three photocells. As the cylinder rotates, the picture is scanned point-by-point in successive lines and the signals from the photocells will be representative of the relative intensities of the foregoing color components at each point thereof. These signals are then electrically processed in a manner analogous to photographic masking and tone-compression so as to obtain corrected signals, correction for "undercolor" or black removal and derivation of a fourth corrected signal representing the amount of black at each point also being achieved. The corrected signals are then respectively employed to control the relative intensities of beams of white light produced by four lamps respectively focused on four negative film plates also wrapped on the rotating cylinder at individual axial positions. The negatives are thus exposed in point-by-point synchronism with the original picture. Thus, after development, they will constitute a set of corrected cyan, magenta and yellow color-separation negatives of the original which may be employed in conventional manner to prepare a set of printing plates.

While high quality results are obtainable with such equipment, the slow scanning speed and the frequent manual readjustment which must be made in the signal processing in order to obtain good results in areas of different photographic content results in about thirty hours being required to prepare the color-separation negatives. In addition, until the printing plates are produced and proofs actually obtained therefrom there is no way of knowing precisely what effect a given adjustment of the electrical signal processing will have on the printed color picture. Extensive retouching of the printing plates which are obtained has, therefore, still been found to be necessary. In accordance with applicant's invention, however, the appearance of the reproduced picture is previewed in advance of any actual printing operation, controls being provided for visually indicating how these operations should be controlled so as to yield printing plates capable of high quality reproduction with little or no retouching. In addition, the previewed image is displayed virtually instantaneously on placing an original picture in the electronic scanner comprised in the previewer.

Figure 1:
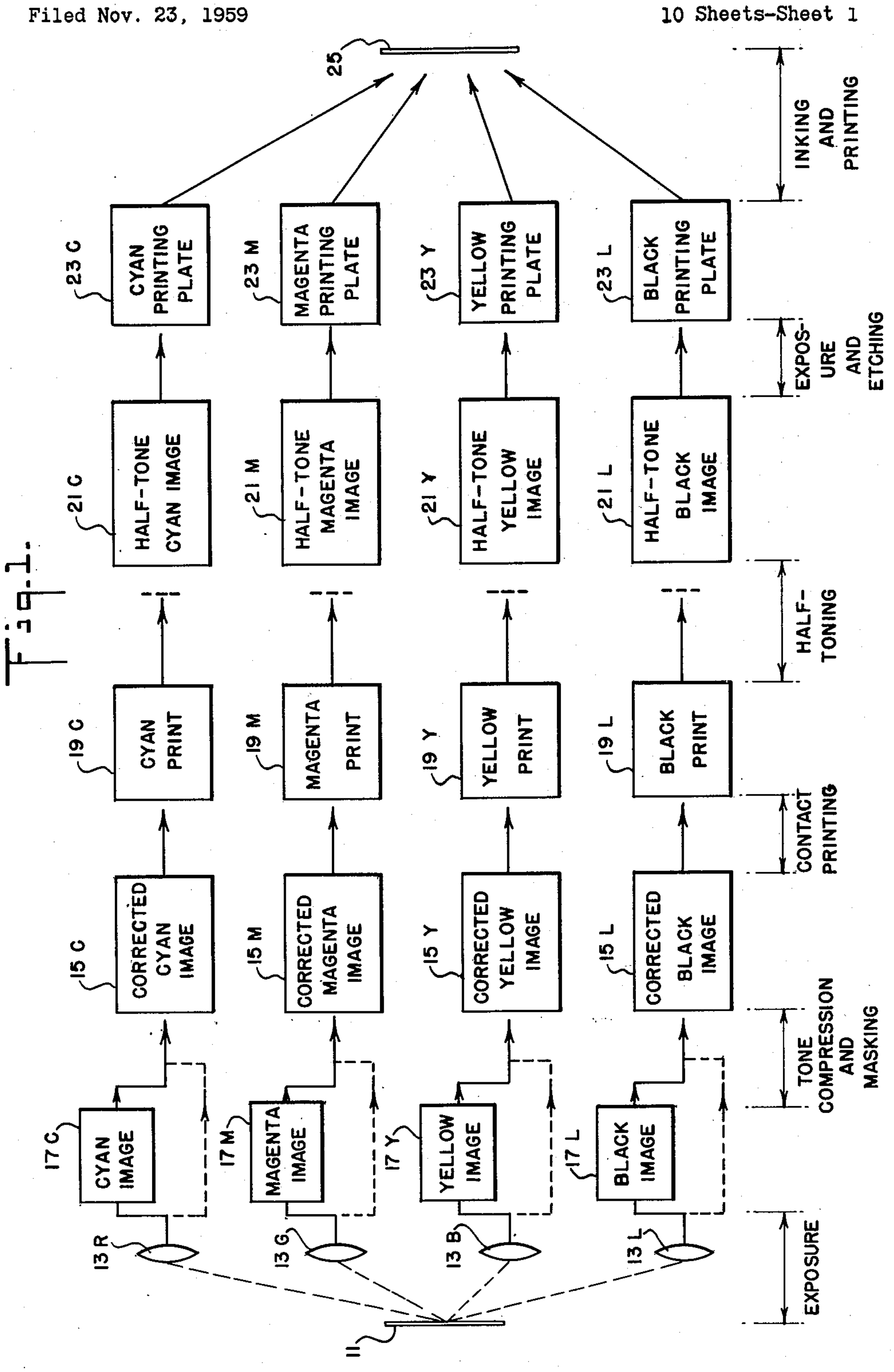
FIG. 1 is a flow diagram of the various operations involved in a typical color printing type of color reproduction process.

*Description of Typical Color Printing Reproduction Process of FIG. 1*

The various operations involved in a typical color reproduction process for obtaining a printed color reproduction of any given original color picture 11 are illustrated by the flow diagram in FIG. 1. The initial operation is to obtain from original picture 11 a set of corrected photographic color-separation images 15C, 15M and 15Y of a set of cyan, magenta and yellow subtractive primary color components thereof. These represent photographic negatives of the complementary set of visually additive red, green and blue primary color components of the light transmitted by the original picture, as may be understood by considering, for example, the corrected cyan image 15C. Since cyan is the complement of red, this image will be dark in regions where the original picture appears strongly red. It, therefore, portrays the relatively low density in such a region of the cyan dye or other pigment employed to subtractively control the occurrence of red in the original picture. Conversely, in an area of the original picture having little or no visual red color, image 15C will be relatively light. This corresponds to the presence of a relatively heavy deposit of cyan pigment in the original picture in that area. It is clear, therefore, that color-separation images 15C, 15M and 15Y are photographic negatives of the red, green and blue visually additive color components of the light transmitted by original picture 11, and are also photographic positives of the complementary subtractive cyan, magenta and yellow subtractive color components of that picture.

One method of obtaining the corrected color-separation images, as suggested in FIG. 1, is to individually expose three film plates to the light from original picture 11 through respective red, green and blue filters 13R, 13G and 13B. A fourth film plate may also be exposed through a neutral filter 13L. These exposures will usually be made in succession. The latent silver images on the film plates are then developed, thus providing a set of uncorrected cyan, magenta, yellow and black photographic color-separation images 17C, 17M, 17Y and 17L. These are then rephotographed and developed, various color-corrections being performed in the process. The corrected images are then photographed to provide corrected images 15C, 15M, 15Y and 15L.

A variety of color-corrections are generally involved in color printing processes. One of these compensates for the fact that the contrast or tonal range obtainable from ink on white paper is only about 1.5, whereas the tonal range of a photographic color transparency is about 2.5. To assure retention of detail in shadows and highlights, therefore, the corrected images are prepared in accordance with a photographic gamma appropriately less than unity with respect to the uncorrected images. This results in compression of tonal variations in each color-separation image. Various degrees of tone-compression, often non-linear, are employed in order to obtain the best results with different types of original color pictures.

Figure 2:
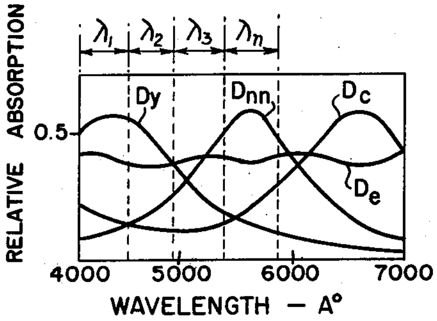
FIG. 2 is a graph of the spectral absorption characteristics of a set of typical color printing inks.

Another color-correction operation, known as "masking," is used to compensate for the fact that the spectral absorption characteristics of the individual printing inks overlap to a considerable extent. A typical set of such characteristics is shown in FIG. 2, curves $D_c$, $D_m$, $D_y$ and $D_l$ being for cyan, magenta, yellow and black inks. Obviously, the cyan and yellow curves each overlap the magenta curve, indicating that the cyan and yellow inks will absorb considerable green light as well as the red and blue light components they are intended to absorb. Similar overlapping occurs between the cyan and yellow curves. If these effects were not compensated the reproduction would suffer from serious color desaturation. A common corrective masking technique is to make a low contrast transparency print of each of uncorrected images 17C, 17M, 17Y and 17L, these prints being known as "masks." Such a mask made from a given color-separation image is then bound in register with the uncorrected separation image of the color which tends to be absorbed by the printing ink corresponding to that mask. For example, the mask made from the cyan image will be dark where the reproduction will have a high cyan ink concentration. This mask is bound together with uncorrected magenta separation image 17M when photographing the latter to obtain the corrected magenta separation negative 15M. The corrected negative is thus lightened, corresponding to a reduction in magenta ink density, in areas of the printed reproduction where the cyan ink will actually absorb a considerable amount of the green light which the magenta ink alone is intended to absorb.

An alternative and more direct tone-compression and masking procedure, shown by the dotted lines in FIG. 1 between the filters and the corrected images, is to develop original uncorrected separation images 17C, 17M and 17Y of very low contrast, and to use appropriate ones thereof as masks over original picture 11 when the latter is successively photographed to directly obtain the corrected negative images 15C, 15M and 15Y. By providing the proper degree of tone-compression in developing the images so obtained, they will be both color and tone corrected. This procedure may be regarded, in effect, as altering the original picture 11 itself so as to obtain a hypothetical original picture ideally suited to the characteristics of the materials employed in the printing process. The Time Inc. Color Scanner noted above operates in accordance with this type of masking.

Another feature of the masking operation may involve provision in the correction of the cyan, magenta and yellow color-separation images for removing variations in density due to variations in the brightness of different areas of original picture 11. This is known as "undercolor removal," and may be accomplished by employing a low contrast transparency print of uncorrected black image 17L as a mask when obtaining each of the corrected images 15C, 15M and 15Y. The corrected black image 15L may also include various corrective measures directed to achieving a greater degree of tone variation, or contrast, in highlight and shadow regions of the reproduction.

Having obtained the corrected color-separation photographic images 15C . . . 15L, the remaining color printing operations may be standardized regardless of picture content, and customarily have rigidly controlled fixed characteristics in a given color printing plant. The first such operation is to derive half-tone color-separation images corresponding to the continuous-tone corrected images. To that end, images 15C . . . 15L may first be contact-printed to obtain a set of low contrast continuous-tone prints 19C, 19M, 19Y and 19L, a low contrast being employed to assure retention of detail in highlight and shadow regions. These prints are then respectively photographed through etched "half-tone" screens onto respective negative film plates which are developed to form the required half-tone corrected color-separation photographic negative images 21C, 21M, 21Y and 21L. A set of printing plates 23C, 23M, 23Y and 23L carrying corresponding images thereon are then prepared by exposing sensitized metallic plates to the respective negative images 21C . . . 21L and developing the exposed plates by means of an acid etching or equivalent undercutting operation which leaves the exposed areas in relief. Of course, this presupposes that the printing process referred to is of the letterpress type, printing plates for other types of printing processes being prepared somewhat differently as described above. However, the principles involved are very closely allied.

The last printing operation involves coating each printing plate with a printing ink or pigment of the color represented by the image thereon. Thus, plates 23C, 23M, 23Y and 23L may be respectively coated with cyan, magenta, yellow and black ink. They are then successively impressed, in register, on a sheet of white paper so that the inked images are overlaid in register. This results in formation of printed color reproduction 25 of original picture 11. When this reproduction is viewed by substantially white light, the correct colors will be reproduced as a result of principal absorption of the red color component of the incident light by the cyan ink, principal absorption of the green color component by the magenta ink, and principal absorption of the blue color component by the yellow ink. The proper tonal variation in different areas of the reproduction is produced by the relative amounts of black ink present therein.

The foregoing description has emphasized the basic features of the various printing operations, but it should be recognized that various additional refinements are often employed in order to obtain still further improved results. For example, due to the tone-compression employed, the reproduction may exhibit poor contrast in highlight and shadow regions. This effect can be anticipated and compensated by a technique known as "highlight boosting," which involves selectively increasing the relative densities of the corrected color-separation photographic images in shadow and highlight regions. Specifically, those regions in images 15C, 15M, 15Y and 15L may be locally subjected to additional exposure prior to development. In this connection it should be noted that the quality of color reproduction 25 is judged subjectively rather than in terms of the precision with which it duplicates the actual color and tone of original picture 11. In fact, it is often possible to modify the color-separation images so as to obtain a reproduction which has a better appearance than the original picture itself.

As pointed out above, one or more of the operations of a color printing process such as that illustrated in FIG. 1 may be performed by various electrical or electronic devices. For example, the Time Inc. Color Scanner performs the operations of tone-compression, masking, undercolor removal and highlight boosting by an analogous processing of the electrical signals derived from the original color picture. Since electrical signal processing circuits are much more readily adjustable than chemical process operations, such equipment provides greater latitude as to the degree and nature of the various color corrections which may be performed.

*Construction of FIG. 3 Electronic Previewer*

Referring now to FIG. 3, there is shown the circuit diagram of an electronic previewer constructed in accordance with the invention. As illustrated, it includes electronic color-image-reproducing means 23 on which the previewer is adapted to display an electronic color image which accurately previews the color reproduction 25 which will be obtained from original color picture 11 by a given color reproduction process. Such process may be similar to that described above with reference to FIG. 1, wherein the reproduction is formed by overlaying impressions of respective color-separation images of the original picture in pigments of the corresponding colors. The illustrated embodiment of the previewer is also adapted to indicate the proper adjustments of the various operations involved in a printing type of color reproduction process so as to obtain optimum results. It comprises electro-optical input means 26 including an electronic scanner 27 for scanning original picture 11 to derive electrical signals R, G and B representative of the relative magnitudes of a set of primary color components thereof. Suitable electronic scanning equipment may comprise a cathode-ray tube 29 actuated by conventional beam deflection and blanking circuits 31 and 33 to produce a flying spot raster of substantially white light on screen 35, the raster being focused on original picture 11 by means of lens 37. The light transmitted by picture 11 is then split by dichroic mirrors 39 into individual beams of its red, green and blue color components directed to the respective photocell amplifiers 41R, 41G and 41B. The photocell amplifiers are responsive to the intensity of the beam incident thereon to produce corresponding R, G and B electrical signals. Variable density filters 43R, 43G and 43B may be respectively interposed ahead of the photocell amplifiers to permit adjustment of the relative spectral taking responses of each channel, including the cathode-ray tube 29, to match as closely as possible the relative taking responses of the film employed in making the original color-separation photographic images in the actual printing process of FIG. 1. Alternatively, when the previewer is to be used to program electronic or electromechanical printing equipment such as the Time Inc. Color Scanner described above, the taking responses of the three channels may be adjusted to match the taking responses of that equipment for the corresponding primary color components. Signals R, G and B will thus be proportional to the relative red, green and blue light transmissions of original picture 11 as seen by the film or other mechanism which is responsive thereto in the actual color printing process. These transmissions will actually be those of a set of complementary cyan, magenta and yellow dyes or other pigments in the picture, so that since transmission is related to density by the relationships $$\text{Transmission}=10 \text{ exp. } (-\text{density}), \text{ or}$$

$$\text{Density}=\log_{10}\frac{1}{\text{Transmission}}=-\log_{10} \text{ transmission}$$

signals R, G and B are also representative of the cyan, magenta and yellow densities of original picture 11.

The R, G and B color-representative signals from scanner 27 are respectively applied to input terminals 451, 452 and 453 of adjustable analog signal processing circuit means 45 also comprised in electro-optical input means 26 and which is adapted to modify them to obtain signals respectively representative of the reflection densities of the respective inked or otherwise pigmented color-separation impressions which are overlaid in the simulated color printing process in order to form printed color reproduction such as 25 in FIG. 1. To this end, such analog processing circuit means electrically processes the applied signals in a manner simulating the operations of tone-compression, masking, highlight boosting, contact printing and half-toning. It further processes the signals in a manner simulating the relationship between the densities of the corrected half-tone color-separation photographic images and the reflection densities of the individual inked impressions of the printing plate images prepared therefrom. Analog processing circuit means 45 additionally serves to derive from the color-representative signals a signal representative of the reflection density of the black ink impression which is laid down in the color printing process. Specific circuit means capable of such operation is illustrated in FIG. 5, and will be described in detail hereinafter. However, the general principle in accordance with which a variety of such circuits may be constructed is well known in the analog computer art. Briefly, the transfer characteristic of each of the printing process operations for each of the color components involved is first ascertained. Electrical circuits are then constructed having analogous input versus output signal-translation characteristics, and are connected in tandem. In this way, the applied R, G and B signals are processed to obtain signals C, M, Y and L at output terminals 455, 456, 457 and 458 of analog processing circuit 45, these also being the output terminals of electro-optical input means 26. The latter signals will be respectively proportional to the reflection densities of the individual cyan, magenta, yellow and black ink impressions which would actually be obtained in the printing process. The various analog processing circuit stages may be provided with controls for adjusting the signal processing effected thereby, such controls being calibrated in terms of corresponding adjustment of the printing process operations being simulated.

The electronic previewer of FIG. 3 further comprises matrixing circuit means 47 connected to electro-optical input means 26 for translating the reflection density-representative signals C, M, Y and L, corresponding to the individual ink impressions, to electronic image-reproducing means 23 and modifying them in accordance with the relative spectral absorptions of the corresponding printing inks or other pigments employed as well as the relative spectral taking responses of the image-reproducing means in each of a plurality of spectral regions $\lambda_1, \lambda_2, \lambda_3, \ldots \lambda_n$. The number of spectral regions employed, and therefore the number of cross-coupling paths required in matrixing circuit means 47, will depend on the accuracy with which it is necessary to simulate the relationship between the resultant spectral density in each incremental region of the printed color reproduction and the spectral densities of the individual inked impressions by which the reproduction is formed. This signal modification may be described more specifically by assuming that image-reproducing means 23 comprises a tricolor cathode-ray picture tube 51 having three input terminals 51R, 51G and 51B which respectively control production of specified red, green and blue primary color components of light on luminous screen 53. The scanning raster on screen 53 may be produced by deflection circuit 31 in input scanner 27, thus assuring synchronous scanning and display. Retrace blanking in tube 51 may be provided by a conventional blanking circuit 54, the latter being actuated by pulses also supplied by deflection circuit 31. To compensate for the exponentially nonlinear light output versus signal input characteristic or "gamma" of tricolor tube 51, image-reproducing means 23 includes conventional gamma corrector circuits 54R, 54G and 54B respectively coupled between signal output terminals 47R, 47G and 47B of matrixing circuit means 47 and the tube input terminals 51R, 51G and 51B. A set of potentiometers 55R, 55G and 55B may also be included across the input terminals of the gamma corrector circuits to permit equalization of the different electron gun drive requirements of tricolor tube 51, potentiometer terminals 56R, 56G and 56B then constituting the input terminals of image-reproducing means 23.

One function of matrixing circuit means 47 is to correct for the difference between the color mixture characteristics of the specified red, green and blue primaries produced by image-reproducing means 23 and the color mixture characteristics of visually correct red, green and blue primary colors. To this end, it modifies the signals translated thereby so that the respective output signals at terminals 47R, 47G and 47B are proportioned in accordance with the spectral taking responses of image-reproducing means 23 in each of a plurality of spectral regions $\lambda_1, \lambda_2, \lambda_3 \ldots \lambda_n$. Assuming the latter means to comprise a tricolor cathode-ray picture tube 51, as described, such taking responses will typically be as shown by Curves $S_b$, $S_g$ and $S_r$ in FIG. 4. The relative proportions of these curves in each such spectral region are the relative proportions which signals at terminals 47R, 47G and 47B must have in order to correctly reproduce the color corresponding to that spectral region. A complete description of the significance and manner of derivation of such taking response curves is given in Chapters 4 and 5 of the textbook Principles of Color Television by the Hazeltine Laboratories Staff, published in 1956, by John Wiley and Sons, Inc. Matrixing circuit means 47 is also constructed to modify the reflection density-representative signals C, M, Y and L translated thereby in accordance with the relative spectral absorptions of the printing inks or pigments in the same spectral regions $\lambda_1, \lambda_2, \lambda_3, \ldots \lambda_n$.

More specifically, matrixing circuit means 47 may comprise a first sub-matrix circuit 57 by which the C, M, Y and L signals at terminals 471, 472, 473 and 474 are cross-coupled in accordance with the relative spectral absorptions (or densities) of the corresponding cyan, magenta, yellow and black printing ink impressions in each of the foregoing spectral regions. The resulting cross-coupled signals then represent the total density of the final printed reproduction 25 to the color represented by each such region. Matrixing circuit means 47 may further comprise a second sub-matrix circuit 59 by which the cross-coupled signals are translated to image-reproducing means 23 further combined in accordance with the relative spectral taking responses thereof in each of the foregoing spectral regions. Means may also be provided by which the foregoing signals are converted to corresponding reflectance-representative signals prior to being combined as described.

Considering the first matrixing operation in more detail, a typical set of relative ink spectral absorptions of the various printing inks for matching a uniform shade of grey are shown by the curves in FIG. 2. Curves $D_c$, $D_m$, $D_y$ and $D_e$ respectively correspond to cyan, magenta, yellow and black ink. Specific spectral regions $\lambda_1, \lambda_2, \lambda_3 \ldots \lambda_n$ have also been indicated, although these may actually be placed as desired. The relative proportions of the spectral absorptions of the inks over each of these spectral regions establish the relative contributions of the individual reflection densities of the cyan, magenta, yellow and black ink impressions to the total density which the printed color reproduction will have in the same spectral regions when the latter are viewed by substantially white light. To simulate this effect, the reflection-density representative signals C, M, Y and L are applied to respective voltage dividing means 57C, 57M, 57Y and 57L within first sub-matrix 57. Each such voltage dividing means is adapted to obtain proportions of the signal applied thereto corresponding to the relative proportions of the spectral absorptions of the corresponding printing inks or other pigments in each of the marked spectral regions in FIG. 2. As illustrated in FIG. 3, each voltage dividing means may be a voltage divider having individual taps at which those proportions of the signal applied thereto are provided. Sub-matrix 57 also comprises circuit means for interconnecting the foregoing voltage dividing means to a plurality of output terminals 572, 574, 576 . . . 57*n* respectively corresponding to the spectral regions $\lambda_1, \lambda_2, \lambda_3 \ldots \lambda_n$. Such circuit means additively cross-couples all the proportions of signals C, M, Y, and L applicable to respective ones of the foregoing spectral regions. The circuit means referred to may comprise individual groups of voltage adding resistors for each output terminal of sub-matrix 57. Two such groups 571 and 573 connected to output terminals 572 and 574 have actually been illustrated in FIG. 3. The resultant cross-coupled signals $D_1, D_2, D_3 \ldots D_n$ at output terminals 572, 574, 576 . . . 57*n* will thus be proportional to the total reflection density of printed color reproduction 25 in the corresponding ones of spectral regions $\lambda_1, \lambda_2, \lambda_3 \ldots \lambda_n$.

The cross-coupled density-representative signals at the output terminals of first sub-matrix 57 are then respectively nonlinearly translated by circuit means such as exponential amplifiers 581, 582, 583 . . . 58*n* to the input terminals 591, 592, 593 and 59*n* of second sub-matrix circuit 59, the foregoing amplifiers serving to convert each such signal to one proportional to the reflectance corresponding to the total density it represents. This is effected in accordance with the relation Reflectance=10 exp. (−reflection density)

Various types of nonlinear amplifiers capable of providing such an exponential signal transmission characteristic are well known. For example, the diode switching circuit shown in FIG. 11–11 on page 221 of Principles of Color Television will be satisfactory. Alternatively, the more versatile and novel nonlinear amplifier disclosed in the copending application of Carl R. Wilhelmsen, Serial No. 803,500, filed April 1, 1959, may be employed. This circuit is also shown in FIG. 7 herein, and will be described subsequently.

The resultant signals $I_1, I_2, I_3, I_n$ applied to input terminals 591, 592, 593 . . . 59*n* of second sub-matrix circuit 59 will respectively be proportional to the relative intensities of the red, green, blue and white components of the light reflected to the eye of the viewer when printed color reproduction 25 is observed. As indicated above, the function of this sub-matrix is to translate those signals to image-reproducing means 23 combined in accordance with their relative contributions to the respective spectral taking responses thereof in each of spectral regions $\lambda_1, \lambda_2, \lambda_3 \ldots \lambda_n$. Sub-matrix 59 may comprise a plurality of voltage dividing means 601, 603, 605 . . . 60*n*, respectively, connected to sub-matrix input terminals 591, 592, 593 . . . 59*n*, each voltage dividing means being adapted to obtain adjustable proportions and polarities of one of the reflectance-representative signals $I_1 \ldots I_n$ applied thereto. To this end, each of the latter means may include a potentiometer and a phase inverting circuit to which the signal is applied in common, the phase inverting circuit including another potentiometer in series therewith. Thus, voltage dividing means 601 may include a potentiometer 601*a* which can be adjusted to obtain various proportions of the reflectance-representative signal $I_1$ at terminal 591 for the spectral region $\lambda_1$. It may also include a phase inverter 601*b* in series with a potentiometer 601*c* for obtaining adjustable negative proportions of the same signal. The remaining voltage dividing means 603, 605 . . . 60*n* are similarly constructed. Each voltage dividing means is adjusted to derive proportions and polarities of the reflectance-representative signal applied thereto corresponding to the relative contributions thereof to the respective spectral taking responses of image-reproducing means 23 in the spectral region applicable to such signal. The signal proportions so obtained may be made available, as illustrated, at individual potentiometer taps. For example, the relative spectral taking responses in the spectral region $\lambda_1$ in FIG. 4 are in the proportions of the average ordinates of curves $S_b$, $S_g$ and $S_r$ in that region. The $S_b$ average ordinate is positive and rather large, the $S_g$ ordinate is negative and small, and the $S_r$ ordinate is somewhat less negative. Accordingly, the tap of potentiometer 601*a* is set to obtain a relatively large positive portion of the $I_1$ signal at terminal 591, the signal $B\lambda_1$ so obtained thus corresponding to the contribution of the $I_1$ reflectance-representative signal to the production of blue light by image-reproducing means 23.

A lower tap setting of potentiometer 601c is employed to obtain a smaller negative portion of the signal at terminal 591, the resultant signal $G\lambda_1$ corresponding to the contribution of the reflectance of printed reproduction 25 in spectral region $\lambda_1$ to production of green light by the image-reproducing means. A still lower tap setting of potentiometer 601c obtains a signal $R\lambda_1$ representing the corresponding contribution to production of red light. In a similar manner, voltage dividing means 603 obtains signals $B\lambda_2$, $G\lambda_3$ and $R\lambda_2$ respectively representing the contributions of the total reflectance of printed reproduction 25 in spectral region $\lambda_2$ to production of blue, green and red light by image-reproducing means 23. Similar signals $B\lambda_3$, $G\lambda_3$, $R\lambda_3$ and $B\lambda_n$, $G\lambda_n$, $R\lambda_n$ are provided by voltage dividing means 605 and 60n for the spectral regions $\lambda_3$ and $\lambda_n$.

Sub-matrix 59 also comprises circuit means connected to voltage dividing means 601, 603, 605 . . . 60n and to each of output terminals 47R, 47G, and 47B of matrixing circuit means 47, the connections being such that all of the signals $R\lambda_1$ . . . $R\lambda_n$ representing contributions to the red taking response are additively combined at terminal 47R; all of the signals $G\lambda_1$ . . . $G\lambda_n$ representing contributions to the green taking response are additively combined at terminal 47G; and all of the signals $B\lambda_1$ . . . $B\lambda_n$ representing contributions to the blue taking response are additively combined at terminal 47B. The resultant combined signals R′, G′ and B′ at these terminals are respectively applied to the red, green and blue input terminals 56R, 56G and 56B of image-reproducing means 23. Since those signals are proportioned in accordance with the relative spectral taking responses thereof, correct color rendition will be obtained. In addition, the signal proportioning in accordance with the reflectances of printed reproduction 25 will cause the image on luminous screen 53 to substantially duplicate the appearance of the latter picture. Specifically, the density, color balance and contrast of the electronic image will closely match that of the printed reproduction.

Having obtained the preview electronic image, the signal modifications effected by electronic analog processing circuit 45 may be altered until the image on screen 53 has a desired or optimum density, color balance and contrast. Calibrated controls may be provided for accomplishing this, so that a similar adjustment of the corresponding operations in the actual color printing process may be made. This will result in an actual printed color reproduction having substantially the same optimum appearance. A great saving of time and improvement of printing quality is thus achieved. In case the previewer is used to control a printing process employing electronic or electromechanical printing equipment, the settings of the previewer controls can be employed for automatically programming the various operations to be carried out by such equipment.

*Electronic Analog Processing Circuit of FIG. 5*

As explained above, once the transfer characteristic of each operation in a photomechanical color printing process such as that illustrated in FIG. 1 has been determined, suitable electronic analog signal processing circuitry 45 may be constructed by providing a series of signal-translating stages respectively having corresponding signal-translation characteristics. The block diagram of FIG. 5 including the continuation thereof designated FIG. 5A is illustrative of an analog processing circuit constructed in that manner. In correspondence with FIG. 3, this circuit has three input terminals 451, 452 and 453, respectively adapted to be connected via input level control potentiometers 40R, 40G and 40B to the photocell amplifiers 41R, 41G and 41B in FIG. 3 to receive the R, G and B signals therefrom. As indicated above, these signals are proportional to the red, green and blue transmissions of original color picture 11 as seen by the film or other means employed to obtain the uncorrected photographic color-separation images 17C, 17M and 17Y in the actual printing process. Since the foregoing transmissions are actually those resulting from the densities of a set of complementary cyan, magenta and yellow color components of the original picture, signals R, G and B are also representative of those densities. The taps of potentiometers 40R, 40G and 40B are respectively connected to nonlinear signal compression amplifiers 63R, 63G and 63B which modify the color-representative signals applied thereto in accordance with the degree of tone-compression performed in the actual color printing process. A set of typical tone-compression characteristics for each of the red, green and blue color components is shown by the curves in FIG. 6, which have been plotted on log-log coordinates. The conventional procedure by which these curves are established is to first decide on the maximum and minimum brightness which can be reproduced in the printed reproduction. These establish the ordinates corresponding to the abscissae of maximum and minimum brightness of original picture 11. Then, a variety of tone-compression curves A, B, E and F may be drawn between the two points so established. Which curve is best in a given case depends on the type of scene to be reproduced and on the judgment of those in control of the printing process. A simple straight line such as curve A has a constant slope less than unity, and so corresponds to exponential tone-compression in accordance with a constant exponent less than unity in all areas of original picture 11. Curves B and E correspond to successively smaller exponents in low transmission or shadowed regions, thus representing successively higher tone-compressions therein, and less compression in highlight regions than curve A. Curve F includes the moderate tone-compression of curve B in shadow regions and fairly sharply reduced compression in middle tones and highlights. Signal-translation characteristics having the same shapes as the foregoing curves may be provided by exponential amplifiers of the well known type employed for gamma correction in color-television transmitters. The requisite differential gain characteristics of such amplifiers will be of the type shown in FIG. 6A, curves A′, B′, E′ and F′ therein respectively corresponding to simulation of the tone-compression characteristic curves A, B, E, and F in FIG. 6.

Each of signal compression amplifiers 63R, 63G and 63B may be constructed so as to provide, at will, any of the gain characteristics of FIG. 6A, the particular one in a given case being selectable by means of control switches schematically indicated as 64R, 64G and 64B. The relative signal levels over which the selected curve extends may then be controlled by the level-setting potentiometers 40R, 40G and 40B. A specific type of amplifier circuit adapted to such operation may simply comprise the above-mentioned diode-switching circuit shown in FIG. 11–11 at page 221 of Principles of Color Television. Alternatively, the novel circuit of FIG. 7, which is disclosed in the above-cited copending application, Serial No. 803,500, may be employed. The compressed output signals $R_c$, $G_c$ and $B_c$ from compressor amplifiers 63R, 63G and 63B thus represent the transmission of original picture 11 as modified in order to compensate for the limited tonal range obtainable in the printed color reproduction.

The compressed signals are then respectively applied to amplifiers 65R, 65G and 65B which logarithmically translate them to obtain signals proportional to $+\log R_c$, $+\log G_c$, and $+\log B_c$ at their positive (+) output terminals, and proportional to $-\log R_c$, $-\log G_c$, and $-\log B_c$ at their negative (−) output terminals. Each logarithmic amplifier may be of the same type as that shown in FIG. 7, with the addition of a linear phase inverter where necessary to obtain sign reversal. Since optical density is equal to the negative logarithm of the associated transmission, and since signals $R_c$, $G_c$ and $B_c$ are proportional to the transmissions of the cyan, magenta and yellow color components of original picture 11, the signals at the (−) output terminals will be proportional to the cyan, magenta and yellow densities thereof. These signals have, therefore, been designated $+C_1$, $+M_1$ and $+Y_1$. The signals at the (+) output terminals will, conversely, be proportional to the negatives of the foregoing densities, and so have been designated $-C_1$, $-M_1$ and $-Y_1$. Their significance may be comprehended by noting that they represent increased cyan, magenta and yellow density with increasing transmission of red, green and blue of original picture 11. Since this is true of red, green and blue color-separation negatives thereof, it follows that signals $-C_1$, $-M_1$ and $-Y_1$ represent the cyan, magenta and yellow densities recorded by such negatives.

All the foregoing density-representative signals are applied to respective input terminals of a color masking matrix circuit 67 which cross-couples them in accordance with the masking operations carried out in the actual color printing process of FIG. 1 in order to obtain the corrected photographic color-separation images 15C, 15M and 15Y. This circuit may simply comprise a network of resistors for coupling each input terminal to each of its output terminals 67C, 67M and 67Y, such resistors being proportioned to simulate the degree of masking effected in the actual color printing process. A specific circuit of this type is shown in FIG. 8.

As explained previously, one of the masking operations in a typical color printing process may include compensation for unwanted absorption of blue light by the magenta printing ink, in addition to the desired absorption of blue by the yellow ink. This involves reducing the yellow ink density in correspondence with increasing magenta ink density, and may be accomplished by increasing the density of yellow as recorded by the blue-separation negative in regions of decreasing density of magenta as recorded by the green-separation negative. Since the latter regions are also those of increasing magenta density of the original picture, the analogous signal modification is to add to the $-Y_1$ signal a proportion of the $+M_1$ signal. This is accomplished in the matrix circuit of FIG. 8 by translating the $-Y_1$ signal to output terminal 67Y via a resistor 869Y and also translating the $+M_1$ signal thereto via a resistor 869M. The $-Y_1$ signal is thus increased by a fraction of the $+M_1$ signal set by the ratio of the resistance of resistor 869M to that of resistor 869Y. This ratio may be set to correspond with the masking percentage actually employed in the color printing process.

A typical color printing masking operation will also usually include compensation for unwanted absorption of green light by the cyan printing ink besides the wanted absorption thereof by magenta ink. This is done by increasing the density of magenta as recorded by the green-separation negative in regions of increasing density of cyan in the original picture. The circuit of FIGURE 8 simulates this by translating the $-M_1$ signal to output terminal 67M via a resistor 870M and also translating the $+C_1$ signal thereto via a resistor 870C. The $-M_1$ signal is thus augmented by a fraction of the $+C_1$ signal determined by the ratio of the resistances of resistors 870C and 870M.

The yellow printing ink is also responsible for unwanted absorption of green light. In blue regions the cyan ink is presented to a much greater degree than the yellow ink so that the effect of the latter can be ignored. However, it becomes increasingly important in other regions where the amount of yellow ink increasingly exceeds the amount of cyan ink. According, the density of magenta as recorded by the green-separation negative should be increased principally in accordance with increasing density of cyan in the original picture so long as the latter density remains larger than the density of yellow therein. As the ratio of cyan-to-yellow positive density falls, the magenta negative density should be increased more in accordance with increasing density of yellow. This type of variable masking correction is simulated in the circuit of FIG. 8 by translating the $+Y_1$ signal through one or more series-connected crystal diodes 873Y, three being illustrated, and further via a resistor 873 to output terminal 67M. In addition, a resistor 873C is provided by which the $+C_1$ signal is also applied to resistor 873. As a result, when the $+C_1$ signal exceeds the $+Y_1$ signal (lower cyan separation negative density), diodes 873Y are nonconductive and the signal at terminal 67M is augmented by a fraction of the $+C_1$ signal alone. The masking ratio will then depend on the ratio of the resistance of resistor 870M to that of the sum of resistors 873C and 873, and simulates the masking appropriate to bluish areas of the color reproduction. When the $+C_1$ signal becomes less than the $+Y_1$ signal, diodes 873Y will conduct and the resultant signal at terminal 67M will include the sum of fractions of both the $+C_1$ and $+Y_1$ signals determined by the relative resistances of resistor 873C and diodes 873Y. As the ratio of the $+C_1$ to $+Y_1$ signals increases, the foregoing masking signal will be increasingly determined by the $+Y_1$ signal because of the increasingly smaller diode resistance. The number of diodes used may be selected to achieve a desired rate of masking variation so as to correspond with the change from heavily blue regions to redder regions of the original color picture.

The circuit of FIG. 8 is further adapted to simulate a color printing masking operation whereby the amount of red in highlight areas is increased in order to compensate for the excessive density of the cyan ink. This is effected by translating the $-C_1$ signal to output terminal 67C by means of a resistor 871C and also translating thereto an "ortholuminous" signal composed of the sum of selected fractions of the $+C_1$, $+M_1$ and $+Y_1$ signals. Specifically, the latter signals are conveyed to terminal 67C by resistors 872C, 872M, and 872Y, respectively. They are thus added together in inverse proportion to the resistances of those resistors, the resulting ortholuminous signal representing the neutral density of original color picture 11. This signal augments the $-C_1$ signal in proportion to the ratio of resistor 871C to the effective resistance of the foregoing summation. A number of circuits such as that in FIG. 8 may be assembled on interchangeable plug-boards, the resistors in each being proportioned to effect different masking percentages applicable to different types of printing inks.

The masked signals at matrix circuit output terminals 67C, 67M and 67Y have been designated $C_2$, $M_2$ and $Y_2$ and are respectively proportional to the densities of the cyan, magenta and yellow images carried by red, green and blue color-separation negatives of a tone-compressed and color corrected original picture 11. As shown in FIG. 5, these signals are respectively conveyed to a set of terminals 69C, 69M and 69Y and are additionally applied to the input terminals 68C, 68M and 68Y of a black signal calculator circuit 68. The latter circuit has three additional input terminals 68R, 68G and 68B at which it also receives the tone-compressed transmission-representative signals $R_c$, $G_c$ and $B_c$ from amplifiers 63R, 63G and 63B, and combines all six input signals to produce a signal L at its output terminal 69L representing the density of the black image carried by a neutral negative photographic image of the tone and color corrected original picture 11. The construction of black signal calculator circuit 68 may be comprehended by recognizing that the amount or black ink to be printed in any incremental region of the printed color reproduction is dependent on the relative degree of overlap of the cyan, magenta and yellow ink dots therein. Since equal superimposed quantities of those inks should produce black, the maximum possible black density in any incremental region is simply proportional to the density of the colored ink which is present therein in least amount. Of course, the colored ink dots will not ordinarily completely cover each other, the degree to which they overlap being dependent on their relative sizes. The actual black density is, therefore, some fraction of the maximum colored ink density. In terms of the signals $C_2$, $M_2$ and $Y_2$, the largest of these represents the density of the most dense color-separation negative image, and so also the colored printing ink dot of least area. It is, therefore, also proportional to the maximum black-separation negative density. The signal L representing the black-separation negative density may, therefore, be obtained by deriving a fraction of the foregoing maximum color density signal.

In accordance with the foregoing principles, black signal calculator 68 derives the required signal L by selecting the maximum one of signals $C_2$, $M_2$ and $Y_2$, and then obtaining a percentage thereof in accordance with the percentage of maximum possible black density which is actually reproduced as black at each area of the printed color reproduction. Such percentages may be determined in accordance with characteristics such as those illustrated by Curves A and B in FIG. 9. Curve A represents a black density percentage approximately proportional to the maximum possible black ink density. The actual black ink density is then approximately proportional to the square of the density of the least dense colored printing ink. The density of the black-separation negative, therefore, resembles a square root function of the density of the most dense color-separation negative. An analogous signal-translation characteristic is illustrated by curve A' in FIG. 10.

Another type of black ink deposition characteristic is illustrated by curve B in FIG. 9, corresponding to maintaining a substantially constant minimum black density in highlight regions wherein the colored ink dot of least area corresponds to a density below a level of about unity. The corresponding signal-translation characteristic is shown by curve B' in FIG. 10. Still other black printing characteristics may be employed, each requiring a corresponding signal-translation characteristic. Black signal calculator 68 may be designed to include circuits for respectively providing all of the signal-translation characteristics which will be required, the appropriate one in a particular case being selectable by means of a control switch 71 indicated schematically in FIG. 5.

A specific type of circuit adapted for use as black signal calculator 68 is shown in FIG. 11, and has input terminals 68C, 68M and 68Y at which signals $C_2$, $M_2$ and $Y_2$ are received. These terminals are respectively connected to the grids of three cathode followers 72C, 72M and 72Y which share a common output resistor 73. The voltage across this resistor will be substantially proportional to the largest of the foregoing signals, and is translated by a nonlinear amplifier 74 to black signal calculator output terminal 69L. Amplifier 74 may be of the type illustrated in FIG. 7, control switch 71 serving to adjust it to obtain the required one of the transfer characteristics shown by curves A' and B' in FIG. 9 or any other variations thereof that may be applicable to a particular color printing process.

An additional color printing practice which is simulated by the black signal calculator circuit of FIG. 11 involves improvement of the contrast in shadow regions by reducing the black ink density therein. This involves increasing the density of the black-separation negative. Since the signals $R_c$, $G_c$ and $B_c$ produced by tone-compression amplifiers 63R, 63G and 63B in FIG. 5 are proportional to the red, green and blue transmissions of the tone corrected original picture 11, an ortholuminous signal representing the composite brightness thereof may be obtained by adding those signals together in their luminance proportions. This composite signal will be of large amplitude in highlight regions and will decrease in middle tone and shadow regions. The foregoing addition is effected by translating the signals $R_c$, $G_c$ and $B_c$ via respective resistors 75R, 75G and 75B to the grid of a vacuum tube cathode follower 76. The ortholuminous summation signal is obtained at the cathode and is translated via a nonlinear amplifier 77 to output terminal 69L where it adds to signal L. Amplifier 77 has a signal-translation characteristic of the type shown by curve 77A adjacent thereto, whereby it provides high signal gain at low signal levels corresponding to shadow regions and a gradually reducing signal gain up to essentially zero at high signal levels corersponding to highlight regions. This type of signal-translation characteristic is substantially logarithmic, so that amplifier 77 may conveniently be of the same type as the amplifier circuit illustrated in FIG. 7.

A final feature of black signal calculator circuit in FIG. 11 is the inclusion therein of a nonlinear signal-translation amplifier 79 for increasing the black-separation negative density-representative signal L at output terminal 69L in strongly yellow and red regions of the printed color reproduction. This corresponds to reduction of the black ink density therein in the interest of improved yellow and red brightness, and is often found advantageous in conventional color printing processes. The yellow and red regions are those wherein the ratio of signals $C_2$ to $Y_2$ is large, so that nonlinear circuit 79 may simply comprise a diode to which those signals are applied and which begins to increasingly translate them as the $C_2$ signal amplitude increasingly exceeds the $Y_2$ signal amplitude. Such an arrangement is very similar to that employed in the masking circuit of FIG. 8 for achieving variable masking of the $M_2$ output signal in accordance with the ratio of the $+C_1$ to $+Y_1$ unmasked signal amplitudes.

Output signal L at terminal 96L in FIG. 5 will be proportional to the density of a black color-separation negative of the corrected original picture 11. To take account of the undercolor removal operation in the actual color printing process, that signal is applied to each of three matrices 81C, 81M and 81Y which respectively subtract it from the $C_2$, $M_2$ and $Y_2$ signals applied thereto at terminals 69C, 69M and 69Y. The resulting signals $C_3$, $M_3$ and $Y_3$ then represent the densities of color-separation negatives of a completely corrected original color picture 11, including elimination of density variations therefrom which will be accounted for by the black-separation negative density-representative signal L at terminal 69L. Each of matrices 81C, 81M and 81Y may simply comprise a phase inverter for inverting the polarity of signal L to obtain a $-L$ signal, and a resistive adding network for adding the $-L$ signal to the color-separation density-representative signal applied to the matrix. The relative sizes of the resistors employed will govern the proportion of signal L which is subtracted, corresponding to a given degree of undercolor removal. If necessary, in order to simulate a nonlinear undercolor removal characteristic, nonlinear subtraction may be provided either by nonlinearly modifying the L signal or nonlinearly translating the signal from which it is subtracted.

The signals $C_3$, $M_3$, $Y_3$ and L are next applied to respective nonlinear amplifiers 83C, 83M, 83Y and 83L which simulate the highlight boost characteristic employed for the corresponding color in the actual color printing process. That is, each of these amplifiers provides increased signal simplification at increasingly higher signal levels in order to simulate the increased exposures to which the color-separation negatives are subjected in highlight regions of original color picture 11 as described above with reference to the typical color printing process of FIG. 1. These amplifiers will thus have a generally exponential type of signal translation characteristic, and may each be of the same type as that illustrated in FIG. 7. The signals $C_4$, $M_4$, $Y_4$ and $L_1$ obtained therefrom will then be respectively proportional to the densities of cyan, magenta, yellow and black color-separation negatives of original color picture 11 as modified in order to compensate for substantially all of the color reproduction deficiencies of the actual color printing process.

The remaining portions of the electronic analog processing circuit of FIG. 5 provide signal-translation characteristics simulating the rigidly standardized color printing operations of developing the corrected color-separation negatives, preparing contact prints therefrom, deriving half-tone color-separation negatives, exposing and etching the corresponding printing plates, and over-laying inked impressions of the individual printing plate images. Pursuant thereto, signals $C_4$, $M_4$, $Y_4$ and $L_1$ are first respectively applied applied to nonlinear amplifiers 85C, 85M, 85Y and 85L which simulate the D vs. log E development characteristic of the negative film plates employed in the actual color printing process for obtaining the color-separation negative images of the corrected original picture. Over a considerable range these characteristics will be linear, having slopes equal to the film gamma. However, the curved "toe" and "shoulder" regions of the film characteristics will normally require a certain degree of nonlinear signal-translation at low and high signal amplitude levels. Such nonlinearity may readily be provided by nonlinear amplifier circuits of the type shown in FIG. 7. The resultant signals $C_5$, $M_5$, $Y_5$ and $L_2$ obtained at the outputs of the D vs. log E amplifiers will be respectively proportional to the densities of the color-corrected separation negatives 15C, 15M, 15Y and 15L obtained in the actual color printing process of FIG. 1. These signals are respectively applied to phase inverters 87C, 87M, 87Y and 87L which simulate the change from a negative image to a contact print thereof. A simple phase inversion is adequate to simulate this operation because the low contrast of the contact print results in a substantially linear D vs. log E characteristic. The resultant signals $C_6$, $M_6$, $Y_6$ and $L_3$ are then translated by another set of D vs. log E simulating amplifier 89C, 89M, 89Y and 89L. The signal-translation characteristics of these amplifiers are respectively the same as the D vs. log E characteristic of the screened negative film employed to obtain each half-tone corrected color-separation negative photograph in the printing process of FIG. 1. A change in gain of about 5.5 to 1 has been found to be required over the signal range in order to simulate this characteristic, and is readily obtained by means of nonlinear amplifiers of the type illustrated in FIG. 7.

The half-tone separation negative density-representative signals $C_7$, $M_7$, $Y_7$ and $L_4$ obtained from amplifiers 89C, 89M, 89Y and 89L are then applied to respective nonlinear amplifiers 91C, 91M, 91Y and 91L which have signal-translation characteristics of the same form as the relation between half-tone separation negative density and resulting reflection density of the inked impression laid down to the corresponding printing plate image. This characteristic, therefore, includes the operations of exposing and etching or otherwise developing the plate images, inking them, and impressing each inked image on the printing paper. Simulation thereof may require a change in gain of about 100 to 1 over the signal range in each of amplifiers 91C, 91M, 91Y and 91L, and may be achieved by nonlinear amplifier circuits of the type shown in FIG. 7. The outputs of these amplifiers are then respectively applied to potentiometers 93C, 93M, 93Y and 93L, the taps of which are connected to the respective output terminals 455, 456, 457 and 458 of the entire analog processing circuit of FIG. 5. These terminals may be connected to the complete electronic previewer as shown in FIG. 3, the signals thereat being the C, M, Y and L signals required to be supplied to matrixing circuit means 47.

It should be noted that many of the nonlinear operations involved in the analog processing circuit of FIGS. 5 and 5A subsequent to undercolor removal matrices 81C, 81M and 81Y are all in cascade, no subsequent signal cross-coupling existing between the various channels. Some or all of the ensuing stages in each channel may, therefore, be combined into a single unit. It should also be noted that any difference between the measured reflection density of an individual inked proof of a given printing plate image and the actual density obtained when all images are overlaid on each other may be accounted for by corresponding modification of the signal-translation characteristics of nonlinear amplifiers 91C, 91M, 91Y and 91L. In some cases this may require some degree of signal cross-coupling therebetween in order to correct one reflection density in accordance with some linear or nonlinear function of the others.

*Nonlinear Amplifier Circuit of FIG. 7*

The foregoing description of the electronic analog processing circuit of FIGS. 5 and 5A indicates that a considerable variety of nonlinear signal-translation characteristics may be required. In each case, such circuit characteristics may conveniently be provided by the nonlinear amplifier circuit illustrated in FIG. 7. This circuit may be constructed as a compact unit having a low power consumption. As mentioned above, it represents an embodiment of the invention disclosed in the copending application of Carl R. Wilhelmsen, Serial No. 803,500, filed April 1, 1959, and reference should be made thereto for a complete description. In general, however, the circuit may comprise a cascade of three junction transistors $T_1$, $T_2$ and $T_3$, the input signal 201 being applied to the base of the first transistor $T_1$ which is connected as an emitter follower. The output signal therefrom is then at a low impedance, and is applied to the base of second transistor $T_2$ connected in common emitter circuit configuration. A D.-C. restorer or clamping circuit such as a transistor 203 periodically resets the base of transistor $T_2$ to a fixed signal reference potential illustrated as ground potential, the coupling capacitor 205 maintaining the base at that potential during intermediate intervals. Clamping transistor 203 may be driven by blanking pulses 205 from blanking circuit 33 in scanner 27 of FIG. 3, so that it only operates during retrace intervals corresponding to the signal "black" level.

Transistor $T_2$ is biased by D.-C. source +B connected to its emitter via rheostat 207, the emitter also being shunted to ground by a much smaller rheostat 209. The collector is returned to ground by a semiconductor PN junction diode 211 in series with a rheostat 213, diode 211 also being shunted by a rheostat 215. The output signal from transistor $T_2$ is obtained at its collector, and is applied via a coupling capacitor to the base of emitter follower transistor $T_3$, the latter being employed because of its high input impedance so as not to affect the current through diode 211. The nonlinearly translated output signal 217 is obtained at the emitter of transistor $T_3$, and is available at output terminal 219. If necessary, linear gain may be provided by coupling an additional common emitter transistor amplifier stage thereto, thus also avoiding phase inversion of the output signal. Output signal 217 has, for example, been illustrated as the logarithm of input signal 201.

The operation of the nonlinear amplifier circuit of FIG. 7 utilizes the fact that the voltage across crystal PN junction diode 211 is a logarithmic function of the current therein. Since the output impedance at the collector of junction transistor $T_2$ is much higher than the highest incremental resistance of the diode, which obtains when the current is at its minimum level, the diode current will be proportional to the input signal voltage applied at the base of transistor $T_1$. The signal voltage across diode 211 is, therefore, a logarithmic function of input signal 201. The circuit of FIG. 7 makes it possible to then select a specific region of that logarithmic characteristic and to linearize it to variable degrees in order to achieve a specified nonlinear characteristic. The requisite region is established by means of rheostats 207 and 209, rheostat 209 primarily controlling the point on the diode characteristic corresponding to the maximum swing of the input signal and rheostat 207 primarily controlling the point corresponding to the minimum signal level. These adjustments provide as close a correspondence as possible between the curvature required and the curvature of the logarithmic characteristic. Then, if the required characteristic is less curved than the logarithmic characteristic beyond this range, which will usually be the case, a reduction in the resistance of shunt rheostat 215 will achieve flattening at lower signal levels and an increase in that of series rheostat 213 will achieve flattening at higher signal levels. If greater curvature than that of a logarithmic characteristic is necessary, two circuits as in FIG. 7 may be cascaded to obtain a log-log over-all maximum curvature. Since a logarithmic characteristic is the inverse of an exponential one, the latter type may be attained simply by inverting the input signal polarity in a preceding amplifier and then establishing the current in diode 211 at a maximum level under the zero signal condition. The output signal voltage will then fall substantially exponentially in relation to the input signal amplitude, so that the phase inversion provided by a linear amplifier subsequent to transistor $T_3$ will provide an output signal which exponentially increases with input signal amplitude. It will also be evident that the provision of signals of opposite polarity relative to ground can be achieved by connecting a transformer across output terminal 219 having a center-tap of its secondary winding connected to ground.

*Utilization of the Electronic Previewer*

In view of the considerable number of nonlinear characteristics involved, it is desirable to provide means for assuring stable operation of the electronic previewer of FIG. 3. The most important factor in assuring stability is that the signals R, G and B supplied to analog signal processing circuit 45 be rendered independent of variations in the light output of cathode-ray tube 29 in scanner 27 and of variations in the signal conversion and gain characteristics of the photocell amplifiers 41R, 41G and 41B therein. As described in the copending joint application of applicant, B. D. Loughlin and I. MacWhirter, Serial No. 678,190, filed August 14, 1957, this may be accomplished by establishing a raster on screen 35 of cathode-ray tube 29 somewhat larger than that required to scan color picture 11. This will allow a path for the scanning beam to bypass the picture at the end of each scanning line prior to retrace. The consequent voltage pulse obtained from each of photocell amplifiers 41R, 41G and 41B will then have an amplitude proportional to the overall product of the intensity of the light from cathode-ray tube 29 and the signal gain of that photocell amplifier. Each such pulse may be applied to a differential feedback circuit in each channel which responds thereto to establish a control voltage proportional to the pulse amplitude. This control voltage proportional to the pulse amplitude. This control voltage is then degeneratively fed back either to the photocell amplifier or the intensity control electrode of cathode-ray tube 29 so as to compensate for variations therein. The differential feedback circuit may be gated by the blanking pulses, so that it only alters the control voltage during retrace intervals.

In employing the electronic previewer of FIGS. 3 and 3A to control a given electromechanical color printing process, it is preferable to have available as a comparison standard an original color picture from which a high quality printed reproduction has previously been obtained by such process. The original picture is placed in scanner 27 and the resulting electronic color image displayed on screen 53 of image-reproducing means 23 is compared in appearance with the specimen printed reproduction. Any differences between the two are then reduced to achieve substantial identity by adjusting the various controls of analog processing circuit 45. For example, the particular type of analog processing circuit shown in FIGS. 5 and 5A permits adjusting the electronic image color balance and density by means of input level potentiometers 40R, 40G, and 40B. The compressor amplifier controls 64R, 64G, and 64B permit contrast adjustment. The black signal calculator control 71 permits adjustment of the degree of black printing employed. The various nonlinear signal-translation characteristics of the nonlinear amplifiers in the circuit may also be adjusted for close color matching. In addition, the degree of highlight boost effected by nonlinear signal-translation circuits 83C, 83M, 83Y and 83L and also that effected by the nonlinear stages 89C . . . 89L and 91C . . . 91L may be set for the particular highlight boost, screening, and photo-engraving characteristics of the process employed.

Having accomplished this initial setup adjustment, an original color picture which is to be printed may be substituted in scanner 27 in place of the standard picture. The resulting electronic image on screen 53 of image-reproducing means 23 is observed and the controls of analog processing circuit 45 are adjusted until a desired appearance is obtained. If the color masking percentages in the printing process are variable, the various resistor ratios in the color masking circuit of FIG. 8, which is comprised in masking matrix 67 of analog processing circuit 45, may also be adjusted to still further improve the appearance of the electronic image. In this case, the same masking percentages are to be employed in the printing process. The degree of highlight boost effected by amplifiers 83C, 83M and 83Y may also be varied, a corresponding degree of boost then being required in the printing process. The degree of tone-compression, black-separation negative density, and color-separation negative exposures in the actual color printing process are then changed from the values applicable to the specimen color print in proportion to the changes in the settings of the compressor amplifier controls, the black signal calculator control and the signal input level potentiometer settings, respectively. These controls can be calibrated in terms of the units employed in the actual printing process for measuring the foregoing factors. Having been so adjusted, the printing process can then be relied on to produce from the original picture a printed reproduction having substantially the same appearance as that which had previously been previewed on the screen of electronic image-reproducing means 23.

While the invention has been described with reference to various particular circuit arrangements employed in an embodiment thereof, it will be obvious to those skilled in the art that many alternative and modified circuits and arrangements may be employed without departing from the true scope of the invention as defined in the ensuing claims.

What is claimed is:

1. An electronic previewer including electronic image-reproducing means for displaying an electronic image of the color reproduction which will be obtained from an original color picture by a color reproduction process wherein the reproduction is formed by overlaying impressions of respective primary color-separation images of the original picture in pigments of the corresponding colors, said previewer comprising: electro-optical input means including an electronic scanner for deriving from said original picture electrical signals respectively representative of the reflection densities of said pigmented color-separation impressions thereof; and matrixing circuit means connected to said input means for translating said reflection-density representative signals to said image-reproducing means and modifying them in accordance with the relative spectral absorptions of said pigments as well as the relative spectral taking responses of said image-reproducing means in each of a plurality of spectral regions; whereby said image-reproducing means is caused to display said electronic color image.

2. An electronic previewer including electronic image-reproducing means for displaying an electronic image of the color reproduction which will be obtained from an original color picture by a color reproduction process wherein the reproduction is formed by overlaying impressions of respective primary color-separation images of the original picture in pigments of the corresponding primary colors, said previewer comprising: electro-optical input means including an electronic scanner for deriving from said original picture electrical signals respectively representative of the reflection densities of said pigmented color-separation impressions thereof; and matrixing circuit means connected to said input means for cross-coupling said reflection-density representative signals in accordance with the relative spectral absorptions of said pigments in each of a plurality of spectral regions; said matrixing circuit means further being adapted to translate said cross-coupled signals to said image-reproducing means and to combine them in accordance with the relative spectral taking responses therof in each of said spectral regions; whereby said image reproducing means is caused to display said electronic color image.

3. An electronic previewer including electronic image-reproducing means for displaying an electronic image of the color reproduction which will be obtained from an original color picture by a color reproduction process wherein the reproduction is formed by overlaying impressions of respective primary color-separation images of the original picture in pigments of the corresponding primary colors, said previewer comprising: electro-optical input means including an electronic scanner for deriving from said original picture electrical signals respectively representative of the reflection densities of said pigmented color-separation impressions thereof; matrixing circuit means comprising a first sub-matrix circuit connected to said input means for cross-coupling said reflection-density representative signals in accordance with the relative spectral absorptions of said pigments in each of a plurality of spectral regions; means further comprised in said matrixing circuit means for converting said cross-coupled density-representative signals to corresponding reflectance-representative signals; and a second sub-matrix circuit additionally comprised in said matrixing circuit means for translating said reflectance-representative signals to said image-reproducing means and combining them in accordance with their relative contributions to the respective spectral taking responses thereof in each of said spectral regions; whereby said image-reproducing means is caused to display said electronic color image.

4. An electronic previewer including electronic image-reproducing means for displaying an electronic image of the color reproduction which will be obtained from an original color picture by a color reproduction process wherein the reproduction is formed by overlaying impressions of respective primary color-separation images of the original picture, said images being colored by respective pigments of the corresponding primary colors, said previewer comprising: electro-optical input means including an electronic scanner for deriving from said original picture electrical signals respectively representative of the reflection densities of said pigmented color-separation impressions thereof; a first sub-matrix circuit comprising a plurality of voltage dividing means connected to said input means for obtaining proportions of each of said reflection density-representative signals corresponding to the relative proportions of the spectral absorptions of the corresponding pigments in each of a plurality of spectral regions; said first sub-matrix circuit further comprising circuit means for interconnecting said voltage dividing means so as to cross-couple all those of said signal proportions applicable to respective ones of said spectral regions; a second sub-matrix circuit coupled to said image-reproducing means; and circuit means for non-linearly translating said cross-coupled signals to said second sub-matrix circuit; said second sub-matrix circuit being adapted to combine the nonlinearly translated signals in accordance with their relative contributions to the spectral taking responses of said image-reproducing means in each of said spectral regions; whereby said image-reproducing means is caused to display said electronic color image.

5. An electronic previewer including electronic image-reproducing means for displaying an electronic image of the color reproduction which will be obtained from an original color picture by a color reproduction process wherein the reproduction is formed by overlaying impressions of respective primary color-separation images of the original picture in pigments of the corresponding colors, said previewer comprising: electro-optical input means including an electronic scanner for deriving from said original picture electrical signals respectively representative of the reflection densities of said pigmented color-separation impressions thereof; a first sub-matrix circuit connected to said input means for cross-coupling said reflection-density representative signals in accordance with the relative spectral absorptions of said pigments in each of a plurality of spectral regions; means connected to said first sub-matrix circuit for exponentially translating said cross-coupled signals to obtain corresponding reflectance-representative signals; a second sub-matrix circuit comprising a plurality of voltage dividing means connected to said exponential signal-translating means for obtaining proportions of each of said reflectance-representative signals corresponding to the relative contributions thereof to the respective spectral taking responses of said image-reproducing means in the spectral region applicable to such signal; and circuit means further comprised in said second sub-matrix circuit and connected to said voltage dividing means for combining all those of said signal proportions which commonly contribute to respective ones of said spectral taking responses and for applying such combined signals to said image-reproducing means; whereby said image-reproducing means is caused to display said electronic color image.

6. An electronic previewer including electronic color-image-reproducing means for displaying an electronic image of the printed color reproduction which will be obtained from an original color picture by a photomechanical printing process, such process including operations for obtaining color-corrected photographic color-separation images of a set of primary color components of the original picture, preparing respective printing plates carrying said images, and overlaying impressions of said printing plate images in printing inks of the corresponding colors to form said printed color reproduction, said previewer comprising: electronic scanning means for deriving from said original color picture electrical signals respectively representative of said primary color components thereof; adjustable analog signal processing circuit means connected to said scanning means for modifying said color-representative signals to obtain signals respectively representative of the reflection densities of the corresponding inked impressions laid down by said printing plates; and matrixing circuit means connected to said signal processing circuit means for translating said reflection-density representative signals to said image-reproducing means and modifying them in accordance with the relative spectral absorptions of said printing inks as well as the relative spectral taking responses of said image-reproducing means in each of a plurality of spectral regions; whereby said image-reproducing means is caused to produce an electronic color image having substantially the same appearance as the printed color reproduction obtainable from said printing process when that process is adjusted in correspondence with the adjustments of said signal processing circuit means.

7. An electronic previewer including electronic color-image-reproducing means for displaying an electronic image of the printed color reproduction which will be obtained from an original color picture by a photomechanical printing process, such process including operations for obtaining color-corrected photographic color-separation images of a set of subtractive primary color components of the original picture, preparing respective printing plates carrying said images, and overlaying impressions of said printing plate images in printing inks of the corresponding colors to form said printed color reproduction, said previewer comprising: electronic scanning means for deriving from said original color picture electrical signals respectively proportional to its transmissions of a set of additive primary color components complementary to said subtractive primary color components; adjustable analog signal processing circuit means connected to said scanning means for logarithmically translating said transmission-representative signals so as to obtain signals respectively proportional to the densities of said subtractive primary color components of said original picture; said signal processing circuit means including means for modifying said original picture density-representative signals to obtain signals respectively representative of the reflection densities of the corresponding inked impressions laid down by said printing plates; and matrixing circuit means connected to said signal processing circuit means for translating said reflection-density representative signals to said image-reproducing means and modifying them in accordance with the relative spectral absorptions of said printing inks as well as the relative spectral taking responses of said image-reproducing means in each of a plurality of spectral regions; whereby said image-reproducing means is caused to produce an electronic color image having substantially the same appearance as the printed color reproduction obtainable from said printing process when that process is adjusted in correspondence with the adjustments of said signal processing circuit means.

8. An electronic previewer including electronic color-image-reproducing means for displaying an electronic image of the printed color reproduction which will be obtained from an original color picture by a photomechanical printing process, such process including operations for obtaining color-corrected photographic color-separation images of a set of primary color components of the original picture, preparing respective printing plates carrying said images, and overlaying impressions of said printing plate images in printing inks of the corresponding primary colors to form said printed color reproduction, said previewer comprising: electronic scanning means for deriving from said original color picture electrical signals respectively representative of said primary color components thereof; adjustable analog signal processing circuit means connected to said scanning means for modifying said color-representative signals to obtain signals respectively representative of the reflection densities of the corresponding inked impressions laid down by said printing plates; matrixing circuit means comprising a first sub-matrix circuit connected to said signal processing circuit means for cross-coupling said reflection-density representative signals in accordance with the relative spectral absorptions of said printing inks in each of a plurality of spectral regions; means further comprised in said matrixing circuit means for converting said cross-coupled density-representative signals to corresponding density-representative signals; and a second sub-matrix circuit additionally comprised in said matrixing circuit means for translating said reflectance-representative signals to said image-reproducing means and combining them in accordance with their relative contributions to the respective spectral taking responses thereof in each of said spectral regions; whereby said image-reproducing means is caused to produce an electronic color image having substantially the same appearance as the printed color reproduction obtainable from said printing process when that process is adjusted in correspondence with the adjustments of said signal processing circuit means.

9. An electronic previewer including electronic color-image-reproducing means for displaying an electronic image of the printed color reproduction which will be obtained from an original color picture by a photomechanical printing process, such process including color-correction operations for obtaining corrected photographic color-separation images of a set of subtractive primary color components of the original picture, preparing respective printing plates carrying said images, and overlaying impressions of said printing plate images in printing inks of the corresponding subtractive primary colors to form said printed color reproduction, said previewer comprising: electronic scanning means for deriving from said original color picture electrical signals respectively representative of the relative densities of uncorrected photographic color-separation images of said subtractive primary color components thereof; adjustable analog signal processing circuit means including color masking matrix means coupled to said scanning means for cross-coupling said signals in accordance with the color-corrections effected in said printing process to obtain corrected signals respectively representative of the relative densities of said corrected photographic color-separation images; nonlinear signal-translating means further comprised in said signal processing circuit means for modifying each of said corrected signals in accordance with the relationship between the density of the corresponding photographic image and the density of the printing plate image obtained therefrom and further in accordance with the relationship between the latter density and the reflection density of the inked impression laid down thereby to obtain signals proportional to the reflection densities of said inked impressions; and matrixing circuit means connected to said signal processing circuit means for translating said reflection-density representative signals to said image-reproducing means and modifying them in accordance with the relative spectral absorptions of said printing inks as well as the relative spectral taking responses of said image-reproducing means in each of a plurality of spectral regions; whereby said image-reproducing means is caused to produce an electronic color image having substantially the same appearance as the printed color reproduction obtainable from said printing process when that process is adjusted in correspondence with the adjustments of said signal processing circuit means.

10. An electronic previewer including electronic color-image-reproducing means for displaying an electronic image of the printed color reproduction which will be obtained from an original color picture by a photomechanical printing process, such process including color-correction operations for obtaining corrected photographic color-separation images of a set of subtractive primary color components of the original picture, preparing respective printing plates carrying said images, and overlaying impressions of said printing plate images in printing inks of the corresponding subtractive primary colors in register to form said printed color reproduction, said previewer comprising: electronic scanning means for deriving from said original color picture electrical signals respectively representative of the relative densities of uncorrected photographic color-separation images of said subtractive primary color components thereof; adjustable analog signal processing circuit means including color masking matrix means coupled to said scanning means for cross-coupling said signals in accordance with the color-corrections effected in said printing process to obtain corrected signals respectively representative of the relative densities of said corrected photographic color-separation images; nonlinear signal-translating means further comprised in said signal processing circuit means for modifying each of said corrected signals in accordance with the relationship between the density of the corresponding photographic image and the density of the printing plate image obtained therefrom and further in accordance with the relationship between the latter density and the reflection density of the inked impression laid down thereby to obtain signals proportional to the reflection densities of said inked impressions; a first sub-matrix circuit connected to said signal processing circuit means for cross-coupling said reflection-density representative signals in accordance with the relative spectral absorptions of said printing inks in each of a plurality of spectral regions; means connected to said first sub-matrix circuit for exponentially translating said cross-coupled signals to obtain corresponding reflectance-representative signals; and a second sub-matrix circuit connected to said exponential signal-translating means for translating said reflectance-representative signals to said image-reproducing means and combining them in accordance with their relative contributions to the respective spectral taking responses of said latter means in each of said spectral regions; whereby said image-reproducing means is caused to produce an electronic color image having substantially the same appearance as the printed color reproduction obtainable from said printing process when that process is adjusted in correspondence with the adjustments of said signal processing circuit means.

11. An electronic previewer including electronic color-image-reproducing means for displaying an electronic image of the printed color reproduction which will be obtained from an original color picture by a photomechanical printing process, such process including operations for obtaining color-corrected photographic color-separation images of a set of primary color components of the original picture, preparing respective printing plates carrying said images, and overlaying impressions of said printing plate images in printing inks of the correspondng colors to form said printed color reproduction, said previewer comprising: electronic scanning means for deriving from said original color picture electrical signals respectively representative of said primary color components thereof; adjustable analog signal processing circuit means connected to said scanning means for modifying said color-representative signals to obtain signals respectively representative of the reflection densities of the corresponding inked impressions laid down by said printing plates; a first sub-matrix circuit comprising a plurality of voltage dividing means connected to said signal processing means for obtaining proportions of said signals corresponding to the relative proportions of the spectral absorptions of the corresponding printing inks in each of a plurality of spectral regions; said first sub-matrix circuit further comprising circuit means for interconnecting said voltage dividing means so as to cross-couple all those of said signal proportions applicable to respective ones of said spectral regions; means for exponentially translating said cross-coupled signals to obtain corresponding reflectance-representative signals; a second sub-matrix circuit comprising a plurality of other voltage dividing means connected to said exponential signal-translating means for obtaining proportions and polarities of each of said reflectance-representative signals corresponding to the relative contributions thereof to the respective spectral taking responses of said image-reproducing means in the spectral region applicable to such signal; and circuit means further comprised in said second sub-matrix circuit for combining all those of said reflectance-representative signal proportions which commonly contribute to respective ones of said spectral taking responses and for applying such combined signals to said image-reproducing means; whereby said image-reproducing means is caused to produce an electronic color image having substantially the same appearance as the printed color reproduction obtainable from said printing process when that process is adjusted in correspondence with the adjustments of said signal processing circuit means.

References Cited in the file of this patent

UNITED STATES PATENTS

| | | |
|---|---|---|
| 2,757,571 | Loughren | Aug. 7, 1956 |
| 2,790,844 | Neugebauer | Apr. 30, 1957 |
| 2,897,259 | Dixon et al. | July 28, 1959 |
| 2,976,348 | Bailey et al. | Mar. 21, 1961 |